(12) United States Patent
Redman

(10) Patent No.: US 11,111,089 B2
(45) Date of Patent: Sep. 7, 2021

(54) PALLET BLOCKING APPARATUS AND RELATED METHOD AND SYSTEM

(71) Applicant: Paul W. Redman, London (CA)

(72) Inventor: Paul W. Redman, London (CA)

( * ) Notice: Subject to any disclaimer, the term of this patent is extended or adjusted under 35 U.S.C. 154(b) by 0 days.

(21) Appl. No.: 16/621,775

(22) PCT Filed: Jun. 27, 2018

(86) PCT No.: PCT/CA2018/050796
§ 371 (c)(1),
(2) Date: Dec. 12, 2019

(87) PCT Pub. No.: WO2019/000096
PCT Pub. Date: Jan. 3, 2019

(65) Prior Publication Data
US 2020/0207556 A1    Jul. 2, 2020

Related U.S. Application Data

(60) Provisional application No. 62/525,414, filed on Jun. 27, 2017.

(51) Int. Cl.
*B65G 59/06*    (2006.01)

(52) U.S. Cl.
CPC ......... *B65G 59/063* (2013.01); *B65G 59/067* (2013.01); *B65G 2201/0267* (2013.01)

(58) Field of Classification Search
CPC ............... B65G 59/063; B65G 59/067; B65G 2201/0267
USPC .......................................... 414/797.4, 797.5
See application file for complete search history.

(56) References Cited

U.S. PATENT DOCUMENTS

| | | | | |
|---|---|---|---|---|
| 3,428,192 A | * | 2/1969 | Witmer | B65G 59/063 414/796.2 |
| 4,701,092 A | | 10/1987 | Reynaud et al. | |
| 4,960,362 A | | 10/1990 | Karpisek | |
| 5,575,613 A | * | 11/1996 | Lierop | B65G 59/066 414/797.4 |
| 2004/0146390 A1 | * | 7/2004 | Lancaster, III | B65G 59/067 414/797.4 |
| 2005/0220600 A1 | * | 10/2005 | Baker | B65G 1/0407 414/626 |
| 2010/0119348 A1 | * | 5/2010 | Snapp | B65G 59/066 414/798.1 |
| 2015/0023773 A1 | | 1/2015 | Redman | |

(Continued)

FOREIGN PATENT DOCUMENTS

WO    WO 2016/009331    *    1/2016    ............. B65G 59/00

*Primary Examiner* — Lynn E Schwenning
(74) *Attorney, Agent, or Firm* — Tarolli, Sundheim, Covell & Tummino LLP

(57) ABSTRACT

A pallet blocking apparatus for use with a pallet dispenser, and related method and system are described. The pallet blocking apparatus comprises, a first wall, a second wall substantially parallel to the first wall and spaced apart for allowing movement of a pallet stack with a top pallet and a bottom pallet there inbetween, the pallet stack being dispensed from the pallet dispenser, a pallet storage area defined by the space between the first wall, the second wall, and a pallet blocker, and the pallet blocker spanning the first wall and the second wall, and substantially perpendicular to the first wall and the second wall, the blocker for blocking the top pallet in the pallet stack and urging the top pallet into the pallet storage area.

16 Claims, 24 Drawing Sheets

(56) References Cited

U.S. PATENT DOCUMENTS

2015/0336753 A1* 11/2015 Lykkegaard ............ B64F 1/368
　　　　　　　　　　　　　　　　　　　　　　414/788.2
2017/0225913 A1　　8/2017　Redman
2017/0267468 A1* 9/2017　Redman ............... B65G 59/063

* cited by examiner

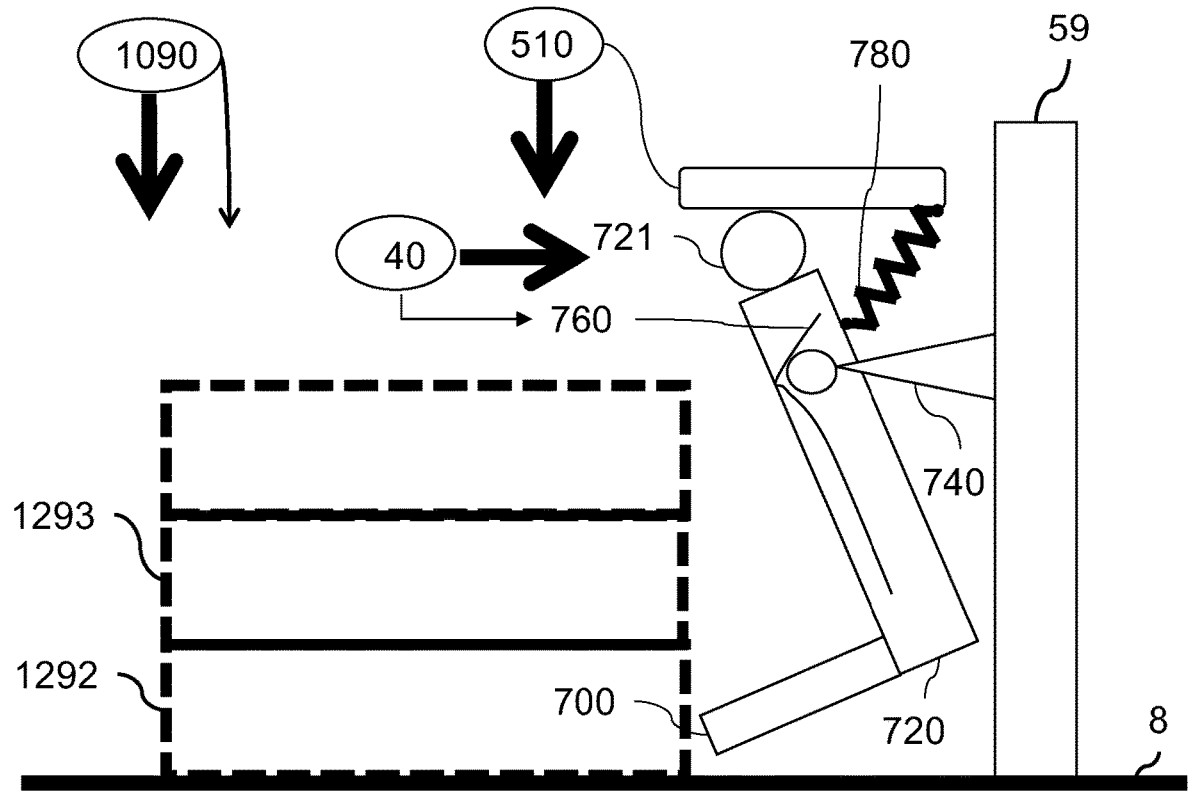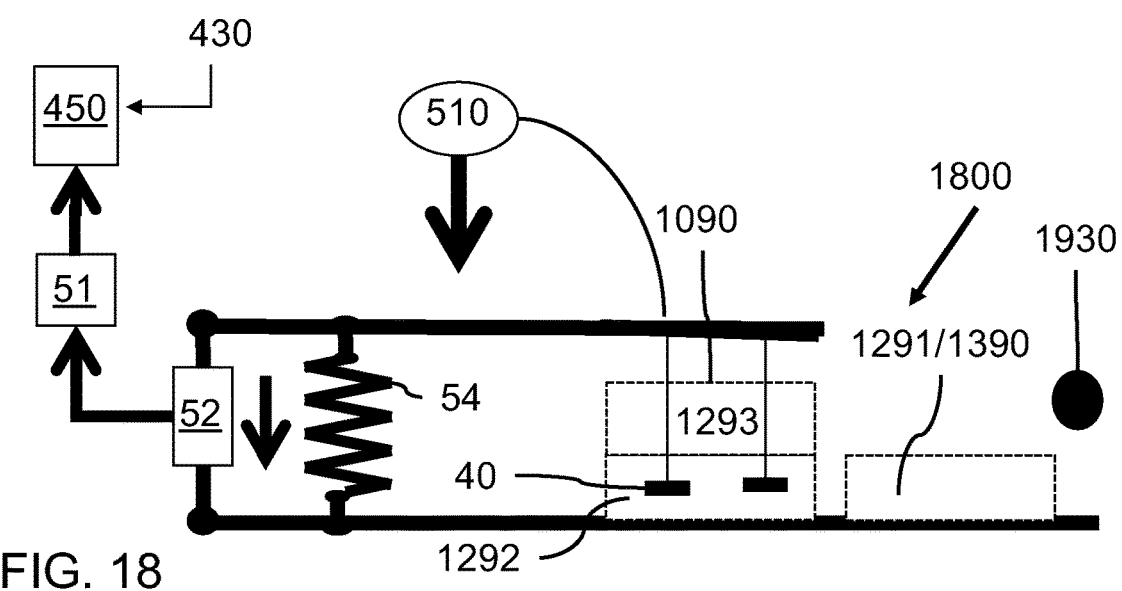
FIG. 18

PALLET BLOCKING APPARATUS AND RELATED METHOD AND SYSTEM

CROSS REFERENCES TO RELATED APPLICATIONS

This application filed under 35 U.S.C § 371 is a national phase application of International Application Serial Number PCT/CA2018/050796 filed Jun. 27, 2018, which claims priority to U.S. Provisional Application Ser. No. 62/525,414, filed Jun. 27, 2017.

TECHNICAL FIELD

Aspects generally relate to an apparatus, a method, and a system for dispensing pallets.

BACKGROUND

A pallet dispenser dispenses one or more pallets from a pallet stack onto a work surface. In an automated environment, this work surface may be a chain conveyor. In other environments, the one or more pallets may be dispensed onto the floor. In these environments, a pallet transporter such as a pallet truck, pallet jack, or forklift can be used to collect and move the one or more dispensed pallets.

Pallet dispensers are typically configured to dispense one pallet at a time.

SUMMARY

What is provided are an apparatus, a method, and a system for a pallet blocking apparatus.

In another aspect, an apparatus, a method, and a system for dispensing more than one pallet in an in-line configuration at a time are provided.

The present disclosure allows for use of the apparatus, the method, and the system with a pallet dispenser. The present disclosure may be used with both powered and unpowered pallet dispensers.

BRIEF DESCRIPTION OF THE DRAWINGS

FIG. 11 to FIG. 19 depicts an embodiment operational sequence of the apparatus using an unpowered pallet dispenser apparatus.

Figure 1:
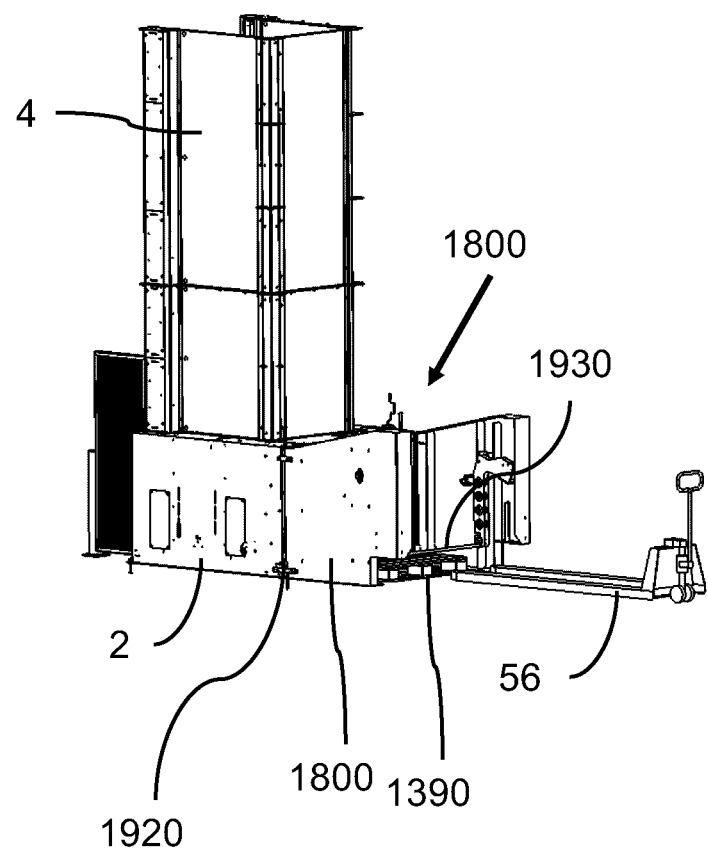
FIG. 1 depicts an embodiment assembly.

LISTING OF REFERENCE NUMERALS USED IN THE DRAWINGS 2 pallet dispenser
4 pallet-stack enclosure
8 work surface
40 latch or latches or securing mechanism
51 hydraulic valve
52 hydraulic cylinder, or telescoping hydraulic cylinder
54 spring assembly
56 pallet transporter
58 hydraulic circuit
59 stationary support frame
430 closed-loop hydraulic circuit
450 hydraulic reservoir
510 movable frame
700 dog, or dogs (bars)
720 arm, or arms, or cam arm
721 cam pivot
740 cam roller, or cam rollers
760 cam follower, or cam followers
780 cam spring
1090 pallet stack
1290 bottom pallet (second in-line pallet)
1291 top pallet
1292 pallet (next bottom pallet)
1293 pallet (next top pallet)
1390 first in-line pallet
1400 pallet transporter or double-deep pallet transporter
1600 unpowered pallet dispensing apparatus
1800 pallet blocking apparatus
1900 first wall
1910 second wall
1920 bracket
1930 blocker
1931 flange
1940 first pivoting arm
1950 second pivoting arm
1960 first pivot
1970 second pivot
1980 counterweight
2000 anti-friction coating/material
2002 rear blocker stop
2003 front blocker stop
2004 pallet storage area
2005 gap between first wall 1900 and second wall 1910

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts an embodiment assembly of the present disclosure. An unpowered pallet dispenser 2 is depicted with a pallet blocking apparatus 1800. The pallet blocking apparatus 1800 is configured to block the passage of a top pallet from a pallet stack while allowing the passage of a bottom pallet from the assembly. In this embodiment the pallet dispenser 2 has a pallet-stack enclosure 4 for enclosing a stack of pallets.

The assembly is configured to work with a double-deep pallet transporter 56. Examples of double-deep pallet transporters 56 include, but are not limited to, double-deep pallet trucks, pallet jacks, walkie riders, etc. A skilled person would understand that a double-deep pallet configuration means that there are two pallets laid end to end.

In this embodiment, the pallet dispenser 2 is a QTEK DSTACKER (TRADEMARK) unpowered pallet dispenser 1600 as disclosed in U.S. Pat. No. 9,181,047 B2 which is herein incorporated by reference. It will be appreciated, however, that any pallet dispenser, whether powered or unpowered, may be used in combination with the pallet blocking apparatus 1800 to dispense two pallets at the same time.

The pallet blocking apparatus 1800 is positioned adjacent to the pallet dispenser 2 in such a way so that a double-deep pallet transporter can engage a bottom pallet of the pallet stack being held by the unpowered pallet dispenser 2. Both the pallet blocking apparatus 1800 and the pallet dispenser 2 may be secured to a work surface (or ground) to keep the apparatus and pallet dispenser 2 in alignment.

The pallet blocking apparatus 1800 and the pallet dispenser 2 may also be secured to each other. In this embodiment the pallet blocking apparatus 1800 is attachable to the pallet dispenser 2. In this embodiment the pallet blocking apparatus 1800 is attached to the pallet dispenser 2 using securing plates, nuts and bolts. As shown in FIG. 1, both the pallet dispenser 2 and pallet blocking apparatus 1800 have receivers through which nuts can be secured using bolts. A securing plate is then secured to the nuts and bolts of the pallet blocking apparatus 1800 and the pallet dispenser 2 so that the securing plate connects, at least in part, both the pallet blocking apparatus 1800 and the pallet dispenser 2.

Other ways of attaching the apparatus for use with the pallet dispenser 1800 to the pallet dispenser 2 can be used without departing from the scope of this disclosure. Other examples of ways of positioning the pallet blocking apparatus 1800 adjacent to the pallet dispenser 2 include bolting the pallet blocking apparatus 1800 to the floor.

Referring now to FIG. 2 to FIG. 6, an operational sequence of the present disclosure is depicted.

Figure 2:
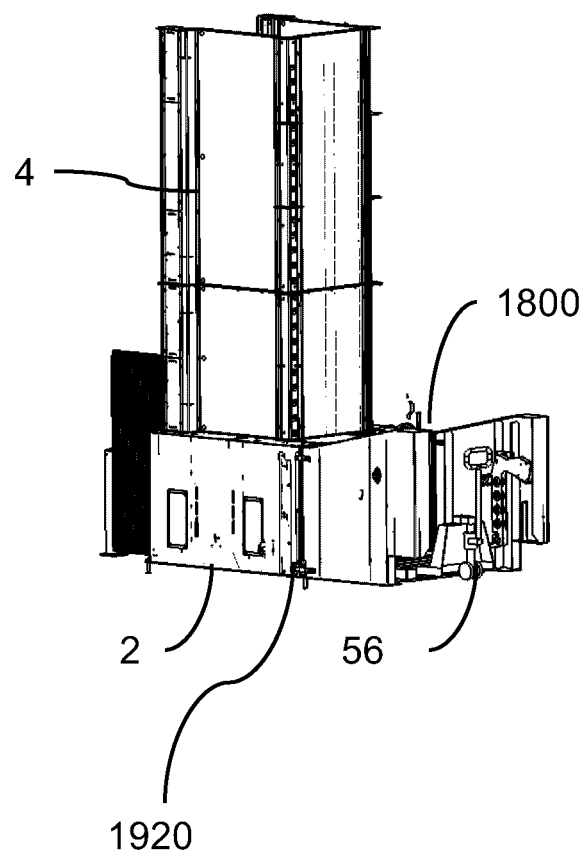
FIG. 2 to FIG. 6 depicts an embodiment operational sequence of the apparatus.

FIG. 2 depicts the double deep pallet transporter 56 engaging the assembly. In this embodiment, the double-deep pallet transporter 56 is shown engaging a first in-line pallet and a second in-line pallet in the assembly. As was shown in FIG. 1, the assembly has a pallet dispenser and a pallet blocking apparatus 1800. In this embodiment the first in-line pallet is a pallet in a pallet storage area 2004 of the apparatus for use with the pallet dispenser 1800, and the second in-line pallet is a bottom pallet of a pallet stack held in the pallet dispenser 2. The first in-line pallet is in-line with the second pallet so that the double-deep pallet transporter can engage both the first in-line pallet and the second in-line pallet. In this embodiment both the first in-line pallet and the second in-line pallet are on the ground 8 or work surface.

Once the double-deep pallet transporter 56 has engaged the first in-line pallet (in the pallet blocking apparatus 1800 for use with the pallet dispenser 2) and the second in-line pallet (in the pallet dispenser 2), the first in-line pallet and the second in-line pallet are raised. The pallet stack in the pallet dispenser 2 is raised along with the second in-line pallet. In this embodiment the double-deep pallet transporter 56 raises the first in-line pallet and the second in-line pallet.

The first in-line pallet and the second in-line pallet are then lowered so that a top pallet and the bottom pallet are separated from the pallet stack, the top pallet being in an overlaying configuration to the bottom pallet. That is, the pallet dispenser 2 dispenses two pallets (i.e., the top pallet and the bottom pallet) from the pallet stack once the first in-line pallet and second in-line pallet are lowered. In this embodiment the pallet dispenser 2 is configured to hold the pallet stack so that the top pallet and bottom pallet can be separated and removed from the pallet stack. In some embodiments the pallet dispenser 2 may hold the pallet stack in this raised position until a specific state of the machine is reached (e.g., a switch is triggered, a pallet is removed from the apparatus, a photoeye detects that the top pallet and bottom pallet have been removed from the pallet dispenser, etc). In another embodiment, the pallet dispenser 2 may begin to lower the pallet stack once the top pallet and bottom pallet are separated from the pallet stack. In this scenario the pallet dispenser 2 should be configured to lower the pallet stack in such a manner so that the dispensed pallets (i.e., the top pallet and the bottom pallet) can be removed from the apparatus.

Figure 3:
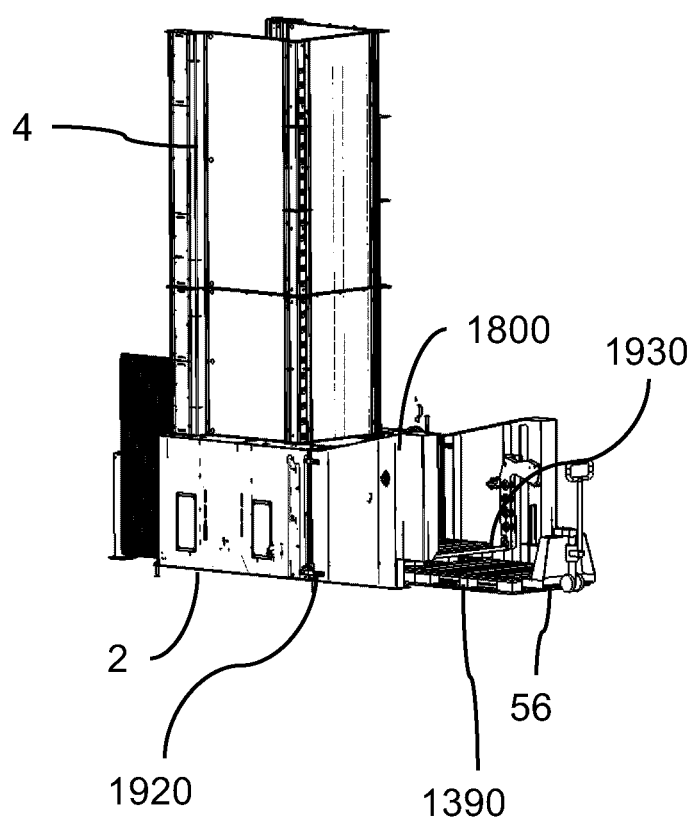

Referring now to FIG. 3, once the two pallets (i.e., the top pallet and the bottom pallet) are separated from the pallet stack, the first in-line pallet is removed from the pallet assembly. In this embodiment the double deep pallet transporter is moved so that the first in-line pallet is removed from the apparatus for use with the pallet dispenser 1800.

Figure 4:
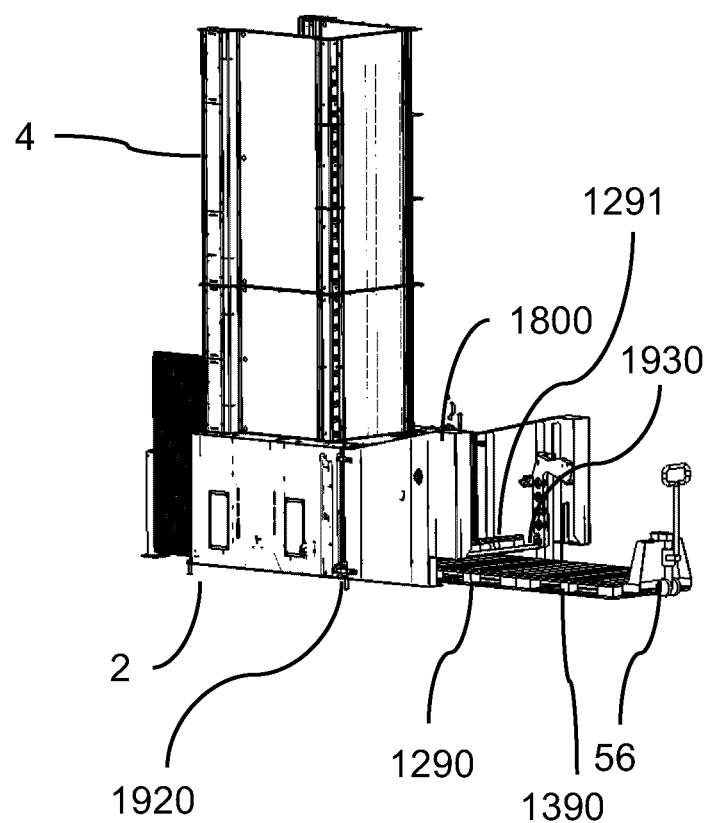
Figure 5:
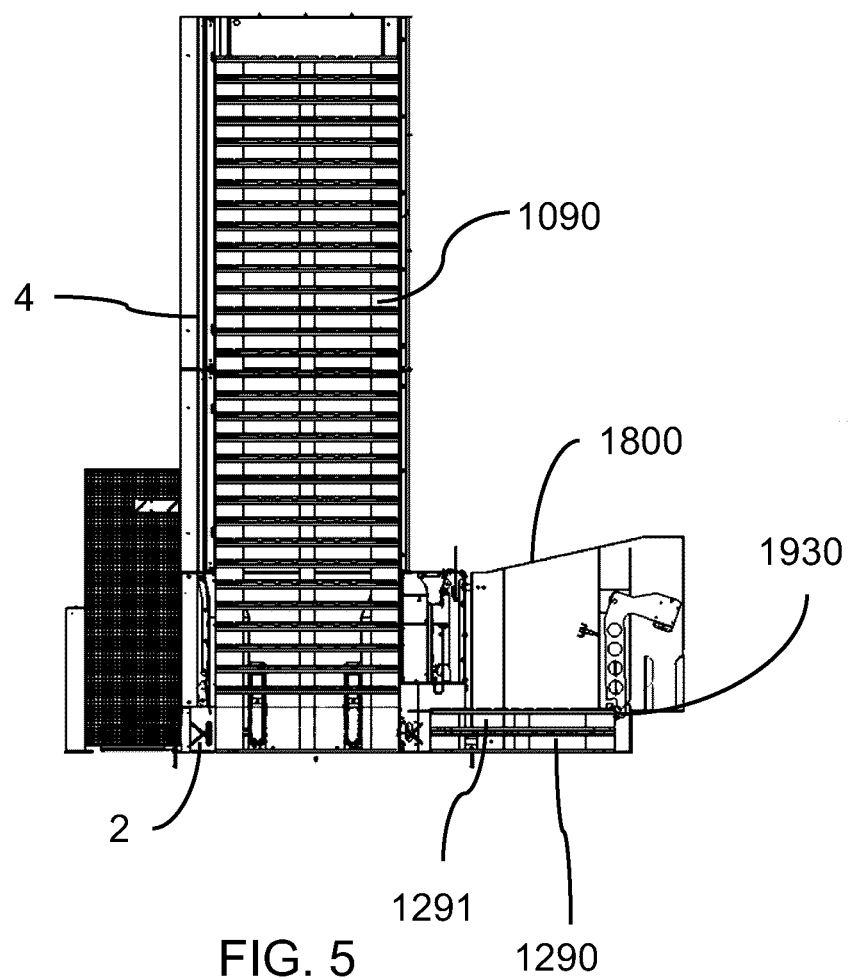

Referring now to FIG. 4 and FIG. 5, once the first in-line pallet is removed from the pallet dispenser assembly and as the second in-line pallet (or bottom pallet) is removed (at least in part) from the pallet dispenser assembly, the top pallet is blocked, by the blocker 1930, from being removed from the blocking apparatus 1800 for use with the pallet dispenser 2 as shown in FIG. 5. As the second in-line pallet (or bottom pallet) continues to be removed, the top overlaying pallet is separated from the second-in line pallet. In this example, as the second in-line pallet (or bottom pallet) is being removed, the top overlaying pallet is slidingly separated from the bottom pallet. In this embodiment the blocker 1930 is preventing the top overlaying pallet from being removed from the apparatus for use with the pallet dispenser 1800.

It will be appreciated that other methods of separating the top overlaying pallet from the bottom pallet can be used without departing from the scope of this disclosure. For example, in other embodiments the top overlaying pallet may be separated by lifting the top pallet, at least in part, from the bottom pallet.

Figure 6A:
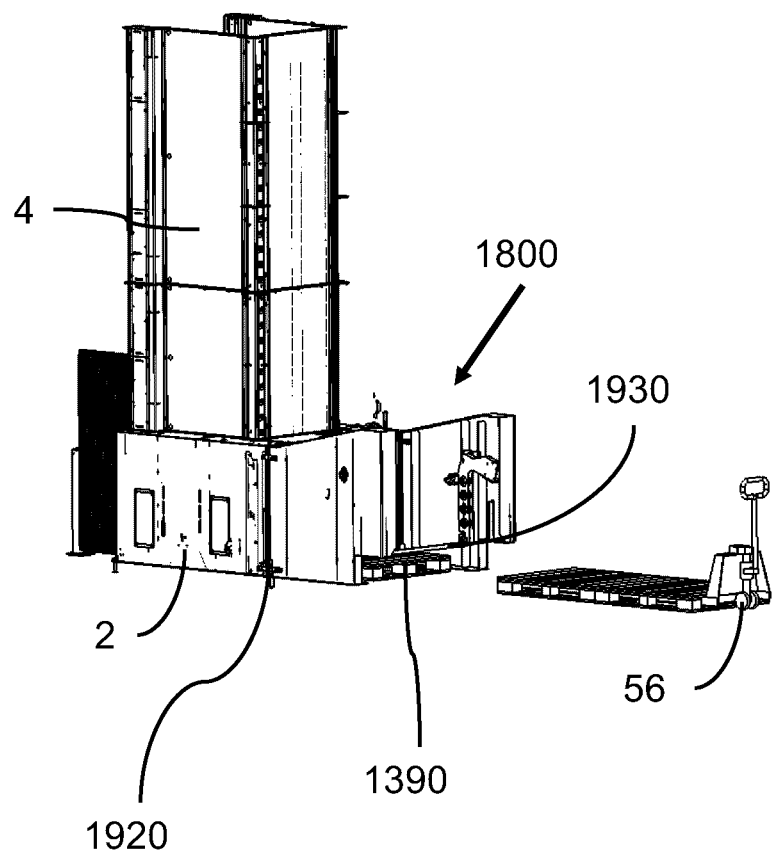
Figure 6B:
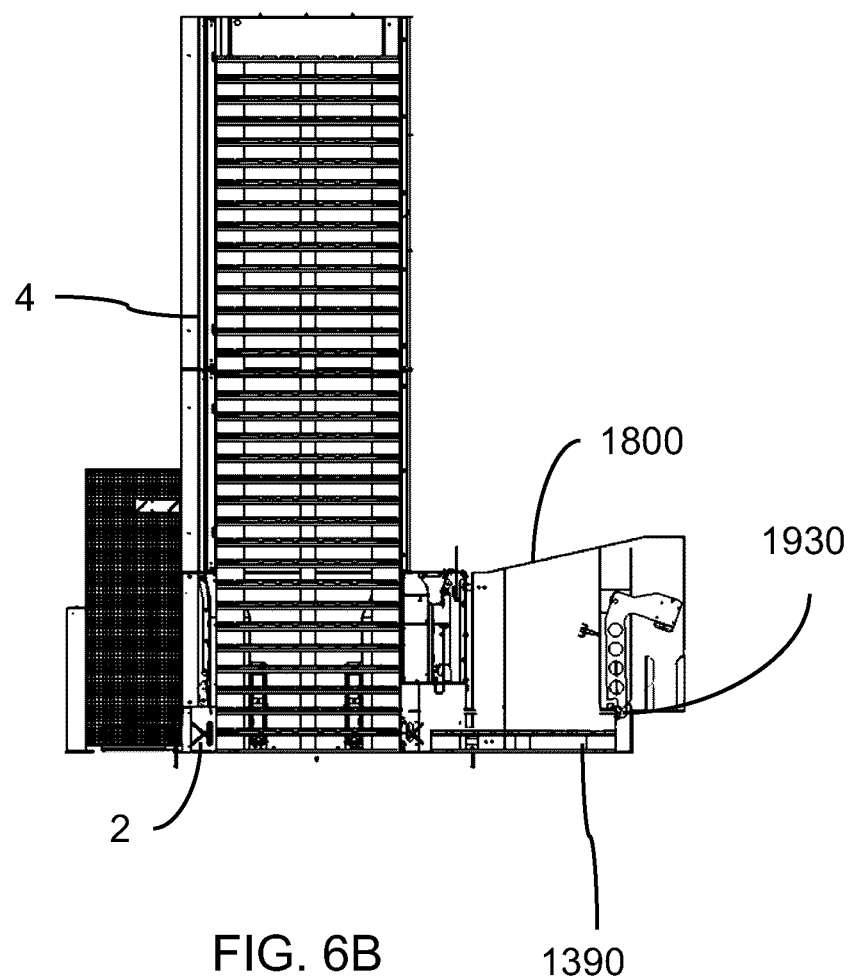
Figure 7:
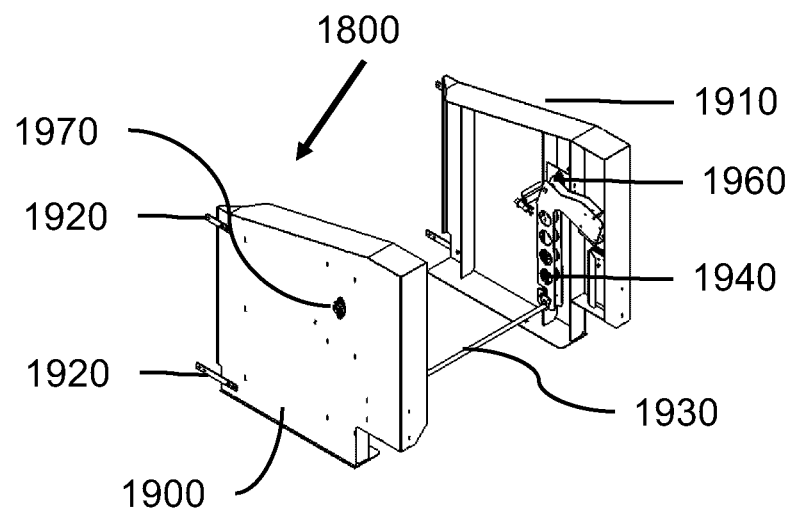
FIG. 7 depicts a perspective view of an embodiment pallet blocking apparatus.

Referring now to FIG. 6A and FIG. 6B, once the second in-line pallet is removed from the unpowered pallet dispenser assembly, the top overlaying pallet has been completely separated from the bottom pallet and is stored in the pallet storage area 2004 of the pallet blocking apparatus 1800. That is, the top overlaying pallet 1291 is in the original position of the first in-line pallet, and the top overlaying pallet is the next first in-line pallet 1390.

The pallet dispenser 2 also lowers the pallet stack so that a bottom pallet of the pallet stack becomes the next second in-line pallet. The apparatus is now ready to dispense another two in-line pallets.

Figure 8:
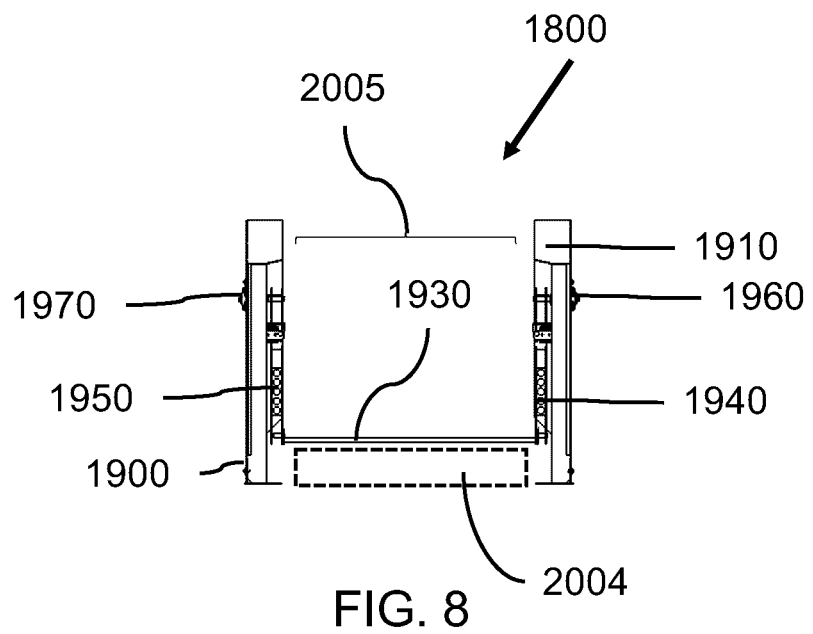
FIG. 8 is a front view of the embodiment of FIG. 7.
Figure 9:
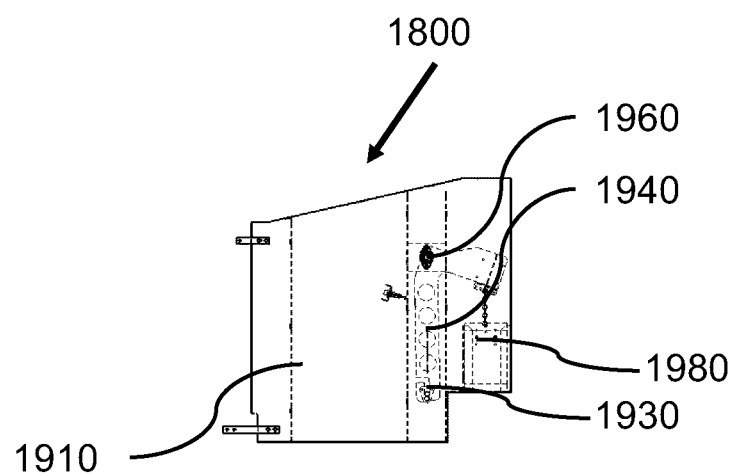
FIG. 9 is a side cutaway view of the embodiment of FIG. 7.
Figure 10:
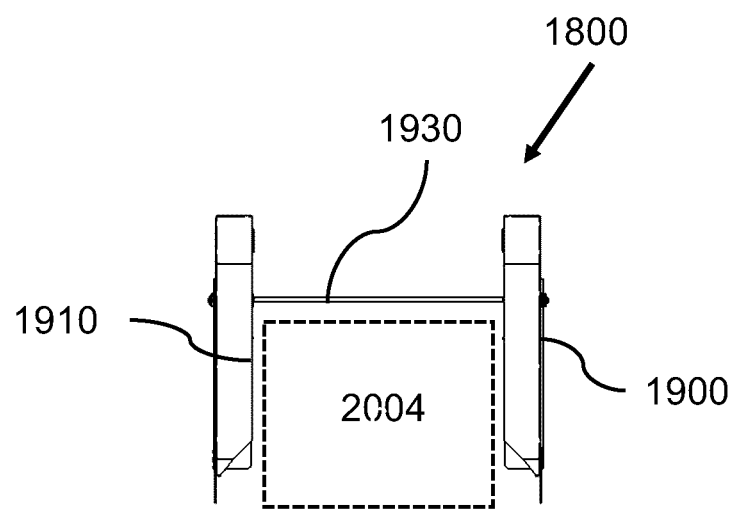
FIG. 10 is a top-down view of the embodiment of FIG. 7.

Referring now to FIG. 7-FIG. 10, FIG. 7 depicts a perspective view of an example pallet blocking apparatus 1800. FIG. 8 depicts a front view of FIG. 7. FIG. 9 depicts a side view of FIG. 7 with a view of the blocker. FIG. 10 depicts a top view of FIG. 7.

As depicted in FIG. 7-FIG. 10, the example pallet blocking apparatus 1800 includes a first wall 1900 and a second wall 1910. The first wall and the second wall are configured to be attachable to a first side of the pallet dispenser and the second side of the pallet dispenser respectively. It will be appreciated that the first wall 1900 and the second wall 1910 of the pallet blocking apparatus 1800 can be attached to the first side and the second side of the pallet dispenser by any known means. For instance, in the example depicted in FIG. 7-FIG. 10, the first wall 1900 of the pallet blocking apparatus 1800 is attached to the first side of the pallet dispenser using a bracket 1920 that is affixed to each of the first wall 1900 and the first side of the pallet dispenser using nuts and bolts. The second wall 1910 of the pallet blocking apparatus 1800 is likewise connected to the second side using a bracket 1920 and nuts and bolts. Other methods of attaching the first wall 1900 and second wall 1910 to the first side and second side of the pallet dispenser can be contemplated without departing from the scope of this disclosure. For instance, the walls may be welded to the sides, attached using a latching mechanism, etc.

The pallet blocking apparatus 1800 also includes a blocker 1930. In the example depicted in FIG. 7-FIG. 10, the blocker 1930 spans a gap between the first wall 1900 and the second wall 1910. The gap 2005 is about the dimension of a pallet, and allows for the pallet to travel in between the first wall 1900 and the second wall 1910. The blocker 1930 is positioned above a work surface in order to block the passage of a top pallet from a pallet stack having the top pallet and a bottom pallet while allowing the passage of the bottom pallet from the apparatus.

It will be appreciated that the blocker 1930 can be any structure capable of blocking the passage of a top pallet from a pallet stack having the top pallet and a bottom pallet while allowing the passage of the bottom pallet from the apparatus. In the example depicted in FIG. 7-FIG. 10, a bar spanning a gap 2005 defined by the first wall and the second wall is used. The bar is positioned above the work surface (or ground) so that a pallet below the blocker 1930 may be removed. As the top pallet and the bottom pallet of the pallet stack are moved away from the apparatus, the blocker 1930 prevents the top pallet from being removed from the apparatus. At the same time, the bottom pallet of the pallet stack is allowed to be removed from the apparatus. In this embodiment, the height of the bar may be adjustable. This allows for the pallet blocking apparatus 1800 to be configurable for the height of the pallets being dispensed.

A skilled person would understand that other kinds of blockers can be used without departing from the scope of this disclosure. Examples of blockers 1930 include, but are not limited to: a third wall connected to the first wall and the second wall; straps, ropes, etc spanning the first wall and second wall having sufficient tension to block the passage of a top pallet from the pallet stack; extenders extending from the first wall and the second wall, the extenders extending, at least in part, towards the gap 2005 defined by the first wall and the second wall but not spanning the gap 2005 defined by the first wall and the second wall; etc.

Referring again to FIG. 7-FIG. 10, the first wall 1900, second wall 1910, and blocker 1930 of the pallet blocking apparatus 1800 defines a space for storing a pallet 2004. The pallet rests on the work surface in the space defined by the first wall 1900, second wall 1910, and the blocker 1930 once the pallet transporter has been completely removed from the assembly. It will be appreciated that the pallet that may be stored in the space 2004 is the (previously) top pallet from the pallet stack (i.e., the pallet that was blocked by the blocker 1930). Once the pallet is in the storage area 2004, it becomes the first in-line pallet. The pallet in this storage area 2004 (i.e., the first in-line pallet) and the second in-line pallet are then ready to be received by the pallet transporter in the next dispensing cycle.

Occasionally pallets in a pallet stack may be inadvertently attached (stuck) to each other. For instance, scenarios may occur where the top pallet is stuck to the bottom pallet because of loose pallet boards, nails, loose fasteners, etc. In an embodiment the pallet blocking apparatus 1800 is configured to allow for the removal of the stuck pallets from the pallet blocking apparatus 1800.

For instance, in an embodiment depicted in FIG. 7 to FIG. 10, the pallet blocking apparatus 1800 is movable between a closed position and an open position to allow for the removal of the stuck pallets from the pallet blocking apparatus 1800. In this embodiment the blocker 1930 is connected to a first pivoting arm 1940 that is pivotingly connected to the first wall 1900 via a pivot 1960, and a second pivoting arm 1950 that is pivotingly connected to the second wall 1910 via a pivot 1970. In some embodiments the blocker 1930 is removable from the pivoting arms 1940, 1950. In other embodiments the blocker 1930 is permanently affixed to the pivoting arms 1940, 1950.

In this embodiment the blocker 1930 is configured to be automatically movable between a closed and an open position (and vice-versa) when pallets are stuck. In this embodiment a counterweight 1980 is used to keep the blocker 1930 in a closed position when unstuck pallets are being dispensed from the system. However, when stuck pallets are being dispensed, the forces keeping the stuck pallets stuck together, in addition to the force being applied to remove the double-deep pallet transporter (or walkie rider) from the pallet blocking apparatus 1800, overcomes the force applied by the counterweight to keep the blocker 1930 in a closed position. When this happens, the blocker 1930 pivots away from pallet dispenser 2 (and towards the double deep pallet transporter/walkie rider) into an open position so that the stuck pallets can pass through the pallet blocking apparatus 1800. Once the stuck pallets are removed from the system (and the forces are no longer applied to the blocker 1930) the counterweight causes the blocker 1930 to pivot back to the closed position.

A skilled person would understand that alternatives to a counterweight can be used without departing from the scope of this disclosure. For example, hydraulic cylinders and/or springs could also be used to keep the blocker 1930 in a closed position while allowing it to transition to an open position when stuck pallets are encountered.

In some embodiments a dampener is used to control or slow the movement of the blocker 1930 when it transitions from a closed position to an open position (or vice versa). Examples of dampeners include, but are not limited to, hydraulic cylinders, springs, etc.

It will be appreciated that alternate ways of removing stuck pallets from the pallet blocking apparatus 1800 (or otherwise allowing for access to the space for storing a pallet) may be used without departing from the scope of this disclosure. For instance, in another embodiment the blocker 1930 may be removable or detachable from the first, wall, second wall, or both so that stuck pallets can be removed and the space for storing a pallet can be accessed. In yet another example, the blocker 1930 may be raiseable in order to allow for stuck pallets to be removed from the pallet blocking apparatus 1800.

Referring now to FIG. 11 to FIG. 19, this sequence of figures depicts an embodiment operational sequence and method of the blocking apparatus 1800 being used with an unpowered pallet dispenser 1600 (an embodiment of the pallet dispenser 2). A method for a primed apparatus or system for use with any suitable pallet dispenser is also depicted in FIG. 24. A method for a non-primed apparatus or system for use with any suitable pallet dispenser is depicted in FIG. 25.

In this example method the blocking apparatus 1800 is in a primed state. That is, a pallet is staged (or stored) in the pallet storage area 2004. It will be appreciated that priming the pallet blocking apparatus 1800 can be done in a variety of methods. This can include, but is not limited to, preparing the apparatus or system by first using the apparatus or system in an unprimed state (i.e. only removing one pallet from the system and leaving the top pallet 1291 as the first in-line pallet 1390 once the stack is removed from the apparatus or system) or manually priming the blocking apparatus 1800 prior to use by physically placing the pallet in the pallet storage area 2004 of the pallet blocking apparatus 1800. The use of the apparatus or system in both the primed or unprimed states is normal and expected. In an embodiment, the primed apparatus or system may dispense two in-line pallets faster.

Each of FIG. 11-FIG. 19 includes an upper schematic and a lower schematic for the purpose of facilitating an understanding of the examples of the apparatus. The upper schematic depicts a partial cross-sectional schematic view of the pallet dispenser. The lower schematic depicts a partial cross-sectional schematic view of the pallet dispenser and pallet blocking apparatus 1800.

The pallet stack 1090 rests on the work surface 8 (or any equivalent work surface). The pallet stack 1090 is held in the unpowered pallet dispensing apparatus 1600. Specifically, the pallet stack 1090 is latched to the movable frame 510. The movable frame 510 is configured to surround (at least in part) the pallet stack 1090. For the sake of convenience, the pallet stack 1090 is depicted as being shorter in height than the top section of the movable frame 510. It is understood that the pallet stack 1090 may extend vertically beyond the upper section of the movable frame 510. The pallet stack 1090 includes a series of pallets positioned or stacked vertically one over the other (one above the other) forming a vertical column of pallets. The pallet stack 1090 includes a top pallet 1291 and a bottom pallet 1290 that contacts the work surface 8. The top pallet 1291 is positioned on (and contacts) a top surface of the pallet 1290. The first in-line pallet 1390 is in the pallet storage space of the pallet blocking apparatus 1800.

The movable frame 510 is configured to be movable relative to the work surface 8. The stationary support frame 59 is configured to be stationary relative to the work surface 8 (such as, connected to or securely mounted to the work surface 8). It will be appreciated that only a portion of the stationary support frame 59 is depicted on one side of the movable frame 510, for the sake of convenient depiction and explanation.

In this example of an unpowered pallet dispenser, the closed-loop hydraulic circuit 430 includes a hydraulic cylinder 52, a hydraulic valve 51 and a hydraulic reservoir 450. The hydraulic valve 51 is configured to selectively connect the hydraulic cylinder 52 to the hydraulic reservoir 450 in such a way that for the case where the hydraulic valve 51 is placed in the open state (open position), hydraulic fluid may flow between the hydraulic cylinder 52 and the hydraulic reservoir 450, and for the case where the hydraulic valve 51 is placed in the closed state (closed position), hydraulic fluid cannot flow between the hydraulic cylinder 52 and the hydraulic reservoir 450. In the open state, the hydraulic valve 51 is configured to provide a restriction (relatively smaller hydraulic orifice) so that the flow (flow rate, liters per hour) of hydraulic fluid may be moderated. As depicted for FIG. 11, the hydraulic valve 51 is placed in the closed state so that the hydraulic fluid cannot flow between the hydraulic cylinder 52 and the hydraulic reservoir 450.

The hydraulic cylinder 52 includes opposite ends (a first end and a second end); the first end of the hydraulic cylinder 52 is securely mounted (operatively coupled) to the work surface 8. The second end of the hydraulic cylinder 52 is securely mounted (operatively coupled) to the movable frame 510. The hydraulic cylinder 52 is configured to moderate movement (limit speed) of the movable frame 510 along a vertical direction relative to the work surface 8. For instance, for the case where the movable frame 510 is released and is permitted to fall (under the influence of gravity) toward the work surface 8, the hydraulic cylinder 52 is configured to limit the speed of free fall in such a way that the movable frame 510 does not come crashing down to the work surface 8, and cause unwanted damage to the movable frame 510. During free fall of the movable frame 510, the movable frame 510 pushes against the operating rod of the hydraulic cylinder 52 so that the hydraulic fluid in the hydraulic cylinder 52 becomes pushed from the hydraulic cylinder 52, past the hydraulic valve 51 (the hydraulic valve 51 presents a flow restriction or a flow resistance) which slows down the flow rate of the hydraulic fluid leaving the hydraulic cylinder 52), and into the hydraulic reservoir 450.

As depicted, for the case where the hydraulic valve 51 is placed in the closed state, the movable frame 510 cannot be moved because the hydraulic fluid cannot be moved from the hydraulic cylinder 52 to the hydraulic reservoir 450, and for this case, the movable frame 510 is said to be in a locked (unmovable) position regardless of any forces applied to vertically) move the movable frame 510. It is preferred that the movable frame 510 is movable along the vertical axis or direction, and not laterally (side to side).

The movable frame 510 is configured to surround the pallet stack 1090. The movable frame 510 includes latches 40 (also called a securing mechanism) positioned on opposite sides of the pallet stack 1090. The latches 40 are configured to selectively latch the movable frame 510 with the pallet stack 1090 (with the opposite sides of the pallet stack 1090), between a latched state (latched condition as depicted in FIG. 11) and an un-latched condition (an un-latched position) as depicted in FIG. 18.

Figure 11:
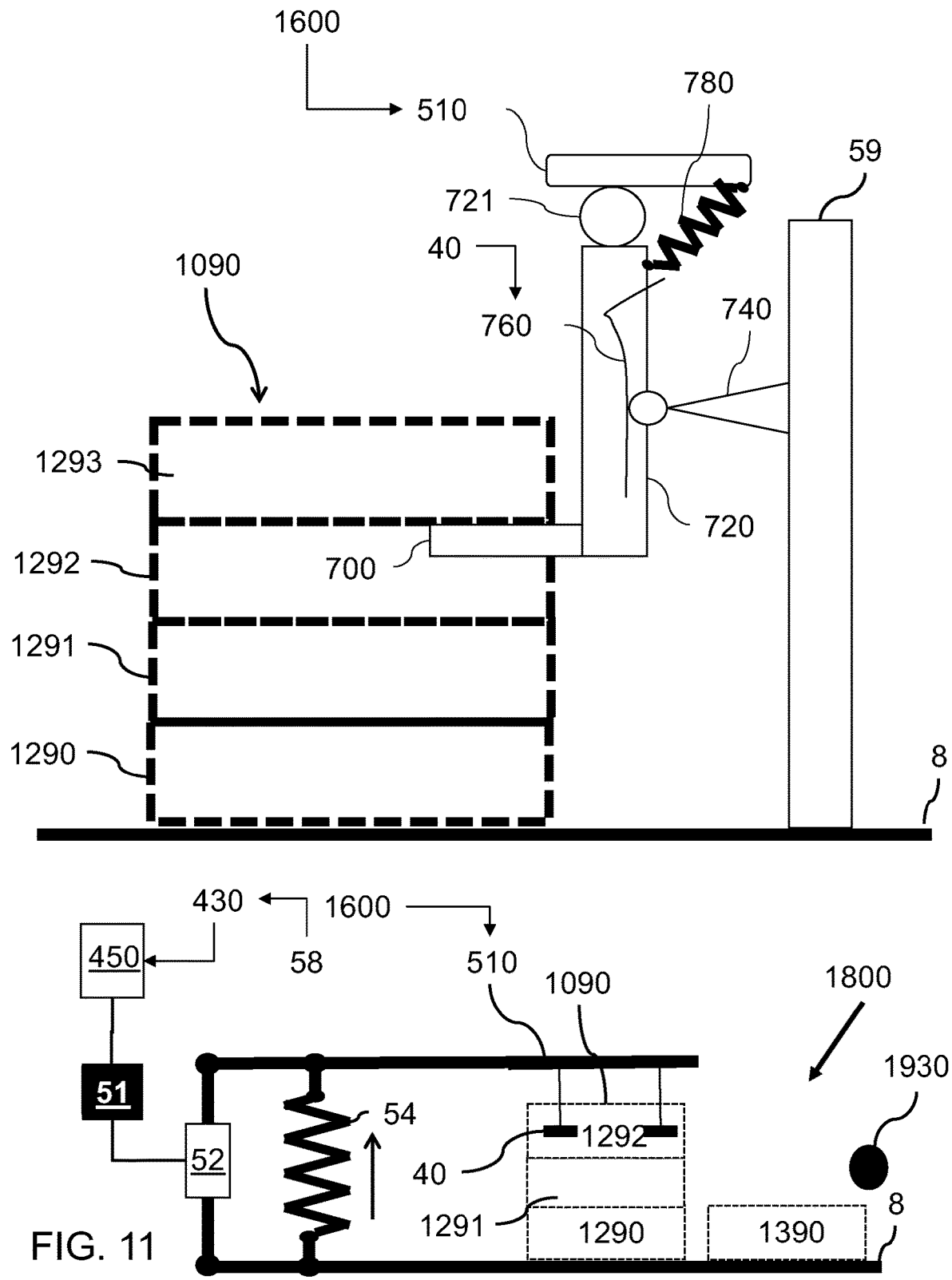

As depicted in FIG. 11, the latches 40 latch the pallet 1292 of the pallet stack 1090, with the movable frame 510, and in this manner the movable frame 510 and the pallet stack 1090 is latched or locked together; it will be understood that the bottom pallet 1290 is positioned on the ground (the pallet-dispensation position), and support the weight of the pallet stack 1090 in this case.

For the case where the hydraulic valve 51 is positioned in the open state, the weight of the pallet stack 1090 keeps (urges) the movable frame 510 in a stationary position (the pallet-dispensation position) relative to the work surface 8, and keeps the movable frame 510 from moving vertically upward away from the work surface 8.

Figure 19:
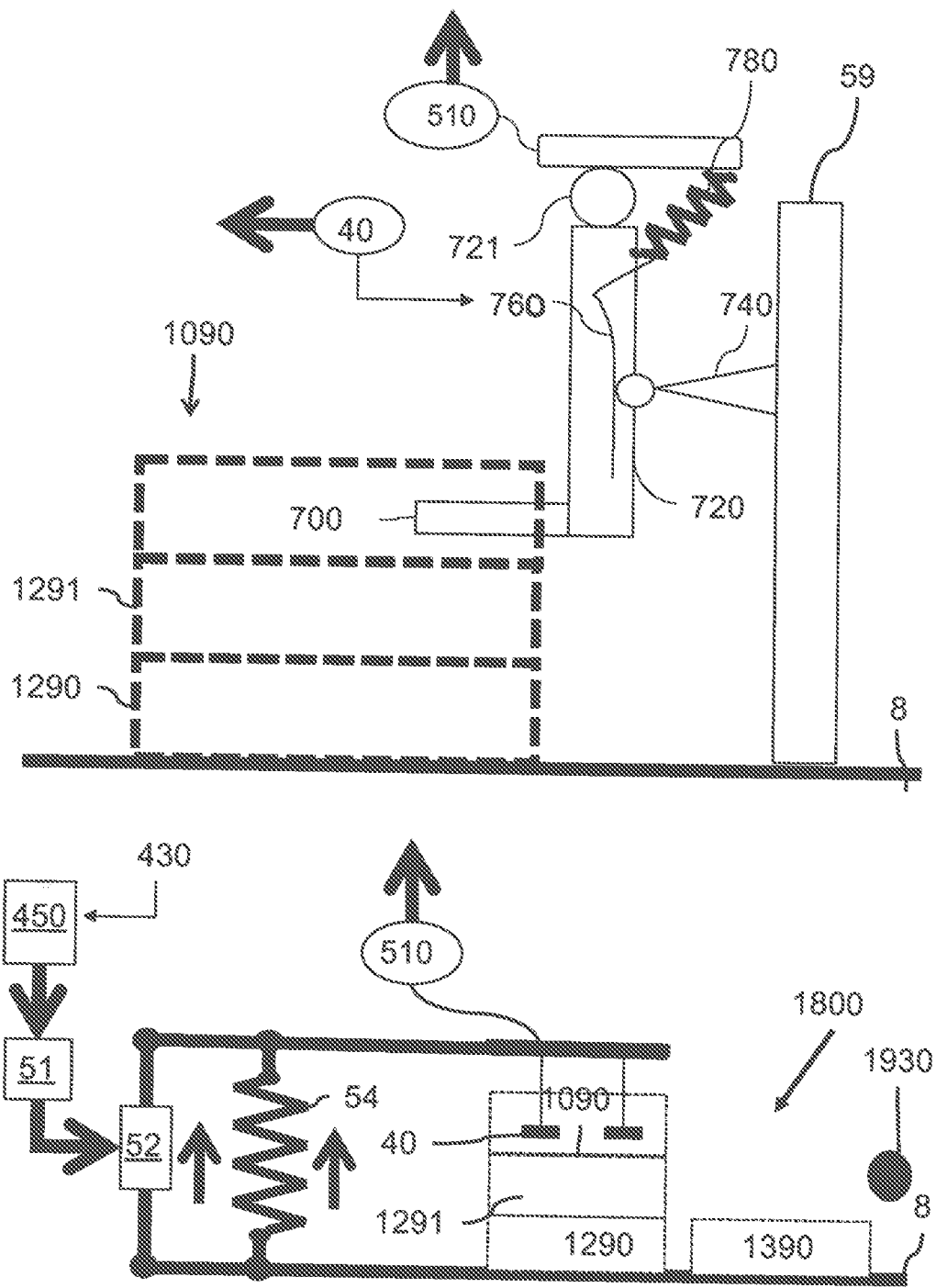

The spring assembly 54 includes opposite ends; specifically, the spring assembly 54 includes a first end configured to be operatively connected to the movable frame 510. The spring assembly 54 also includes a second end configured to be operatively connected to the work surface 8. The spring assembly 54 is configured to provide energy storage and conversion. The spring assembly 54 may also be called an energy-storage assembly. The spring assembly 54 is configured to selectively (directly or indirectly) convert mechanical kinetic energy into potential energy and vice versa. For example, the spring assembly 54 is configured to push or to move the movable frame 510 back to the position as depicted in FIG. 11, which is also depicted in FIG. 19 as well. In FIGS. 18 and 19, the spring assembly 54 becomes compressed (receives mechanical kinetic energy from the movable frame 510 as the movable frame (510) moves under the force of gravity under a controlled decent), and the spring assembly 54 continues to stay compressed or become compressed as long as the latches 40 continue to latch the movable frame 510 with the pallet stack 12. Once the latches 40 release (release the movable frame 510 from the pallet stack 12), the spring assembly 54 is permitted to expand (because the latches have been released), and the spring assembly 54 converts potential energy (stored energy) into mechanical kinetic energy in such a way as to vertically move the movable frame 510 away from the work surface 8. As depicted in FIG. 11, the spring assembly 54 is in the neutral state (in which no energy stored in the spring assembly 54). The action of the spring assembly 54 is described in connection with FIG. 17 and FIG. 18. In another embodiment, a counter weight system is used to convert mechanical kinetic energy into potential energy and vice versa.

Referring to FIG. 11, in accordance with a specific example, the latch 40 includes: a cam roller 740, a cam pivot 721, an arm 720, a cam follower 760, and a dog 700. It will be appreciated that the instance of the latch 40 is depicted in the schematic in FIG. 11 (for the sake of convenience). The dog 700 may be called an arm extension. The cam follower 760 is provided by the arm 720. The cam roller 740 is fixedly connected to the stationary support frame 59, and rollably contacts the cam follower 760 provided by the arm 720. The cam pivot 721 is operatively connected to the movable frame 510. The arm 720 is pivotally connected to the cam pivot 721 in such a way that the arm 720 is configured to pivot relative to the movable frame 510 between a latching state or a latching condition (as depicted in FIG. 11), and a non-latching state or a non-latching condition as depicted in FIG. 18. The arm 720 is configured to move relative to the cam roller 740 in response to vertical movement of the movable frame 510 in such a way that contact between the cam roller 740 and the cam follower 760 is operatively maintained. The dog 700 extends from the arm 720, at a lower portion of the arm 720. The dog 700 is configured to selectively engage a pallet of the pallet stack 12. For the case where the latch 40 is placed in the latched position (FIG. 11), the dog 700 engages the pallet, such as the pallet 1292. For the case where the latch 40 is placed in the un-latched position (FIG. 18), the dog 700 does not engage (not latch) the pallet, such as the pallet 1292.

Referring to FIG. 11, the spring assembly 54 (which is an example of a raising device) is configured to apply a vertical lifting force to the movable frame 510, and the vertical lifting force is large enough to vertically lift the movable frame 510 upwardly away from the work surface 8. However, the movable frame 510 moves vertically upwardly and once the movable frame 510 engages with the pallet stack 1090 (via the dogs 700 of the latches 40), the lifting force provided by the spring assembly 54 is not large enough to continue to vertically lift both the combined weight of the movable frame 510 and the pallet stack 1090 upwardly and away from the work surface 8. As depicted in FIG. 11, once the movable frame 510 moves vertically and engages (becomes latched) with the pallet stack 12, the movable frame 510 remains stationary relative to the pallet stack 12 while the lifting force of the spring assembly 54 continues to be applied to the movable frame 510, while the weight of the pallet stack 1090 continues to overcome or defeat the lifting force provided by the spring assembly 54 to the movable frame 510. In another embodiment, a counter-weight is used as the raising device.

Figure 12:
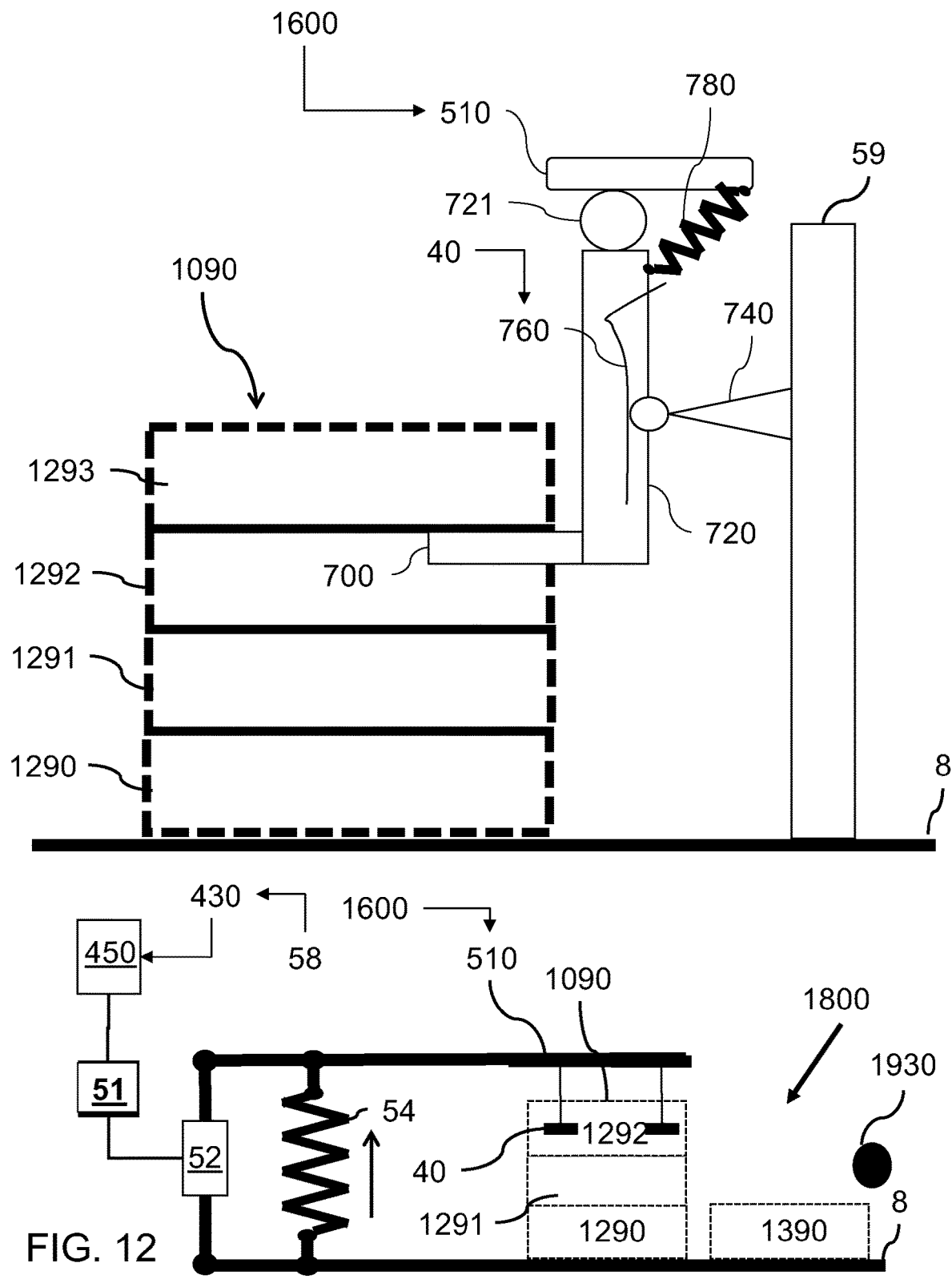
Figure 13:
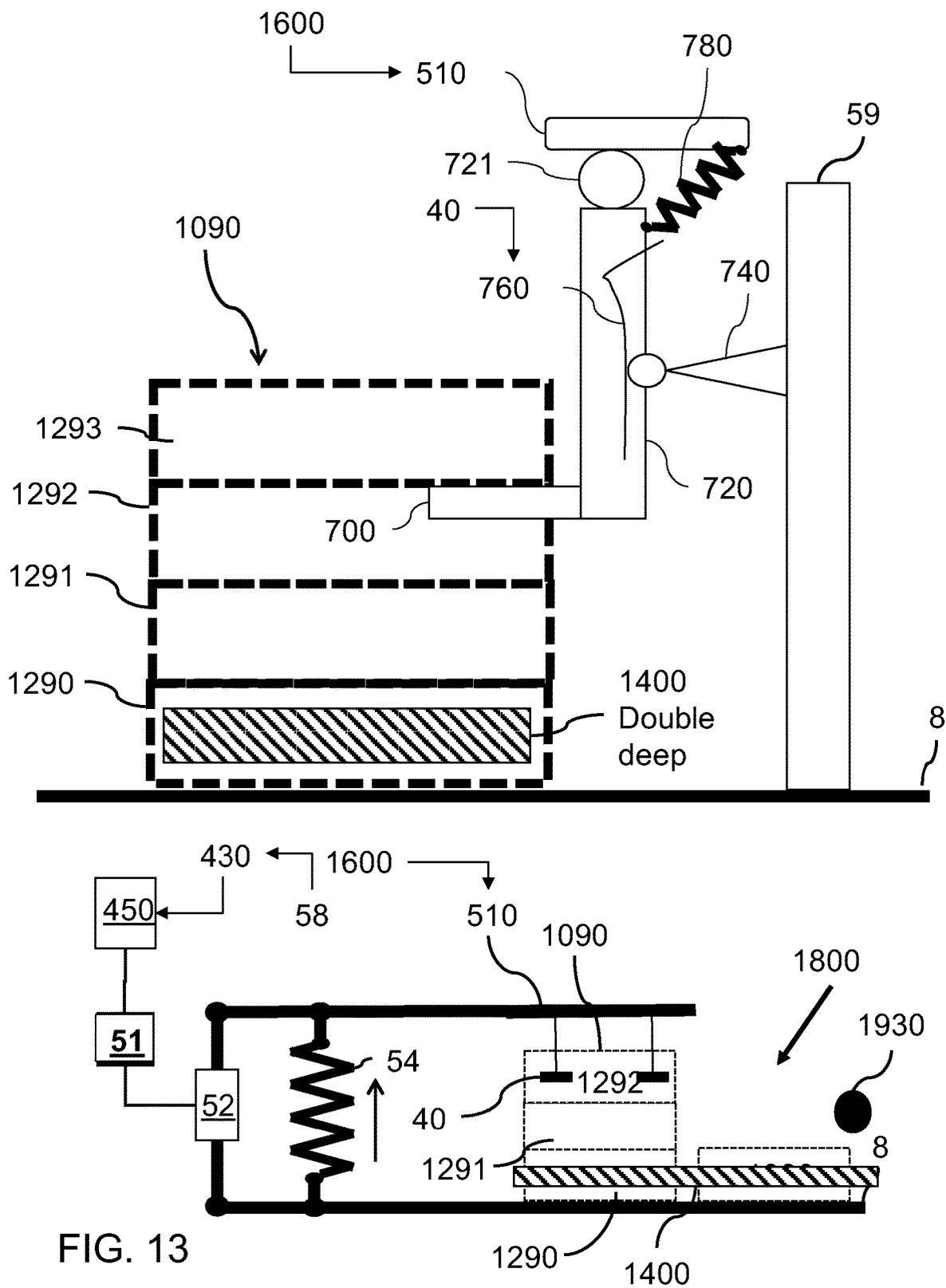

Referring now to FIG. 12, the next operational sequence is depicted. The hydraulic valve 51 is placed in the open state, so that the hydraulic fluid may flow between the hydraulic reservoir 450 and the hydraulic cylinder 52 in response to vertical movement of the movable frame 510 (to be caused by the double-deep pallet transporter 1400, which is not depicted in FIG. 12 but is depicted in FIG. 13). For the case where the hydraulic valve 51 is placed in the open state and the movable frame 510 is not urged to be moved, then the fluid does not flow between the hydraulic reservoir 450 and the hydraulic cylinder 52. Once the hydraulic valve 51 is placed in the open state, and the movable frame 510 is free to fall (under influence of gravity) so that the dog 700 contacts the lower section of the pallet 1292.

Referring now to FIG. 13, the next operational sequence is depicted. The double-deep pallet transporter 1400 is moved into the bottom (second in-line) pallet 1290 and the first in-line pallet 1390. The bottom (second in-line) pallet 1290 and first in-line pallet 1390 define an opening configured to receive the forks of the double-deep pallet transporter 1400. The double-deep pallet transporter 1400 is now ready to vertically lift the pallet stack 1090, by the bottom (second in-line) pallet 1290, and the first in-line pallet 1390 (and the movable frame 510) away from the work surface 8. As depicted, the double-deep pallet transporter 1400 is ready to lift the pallet stack 1090, by the bottom (second in-line) pallet 1290, the first in-line pallet 1390 and the movable frame 510 (since the pallet stack 1090 and the movable frame 510 are latched together by the latches 40). In the unprimed embodiment, the first in-line pallet 1390 will not be present.

Figure 14:
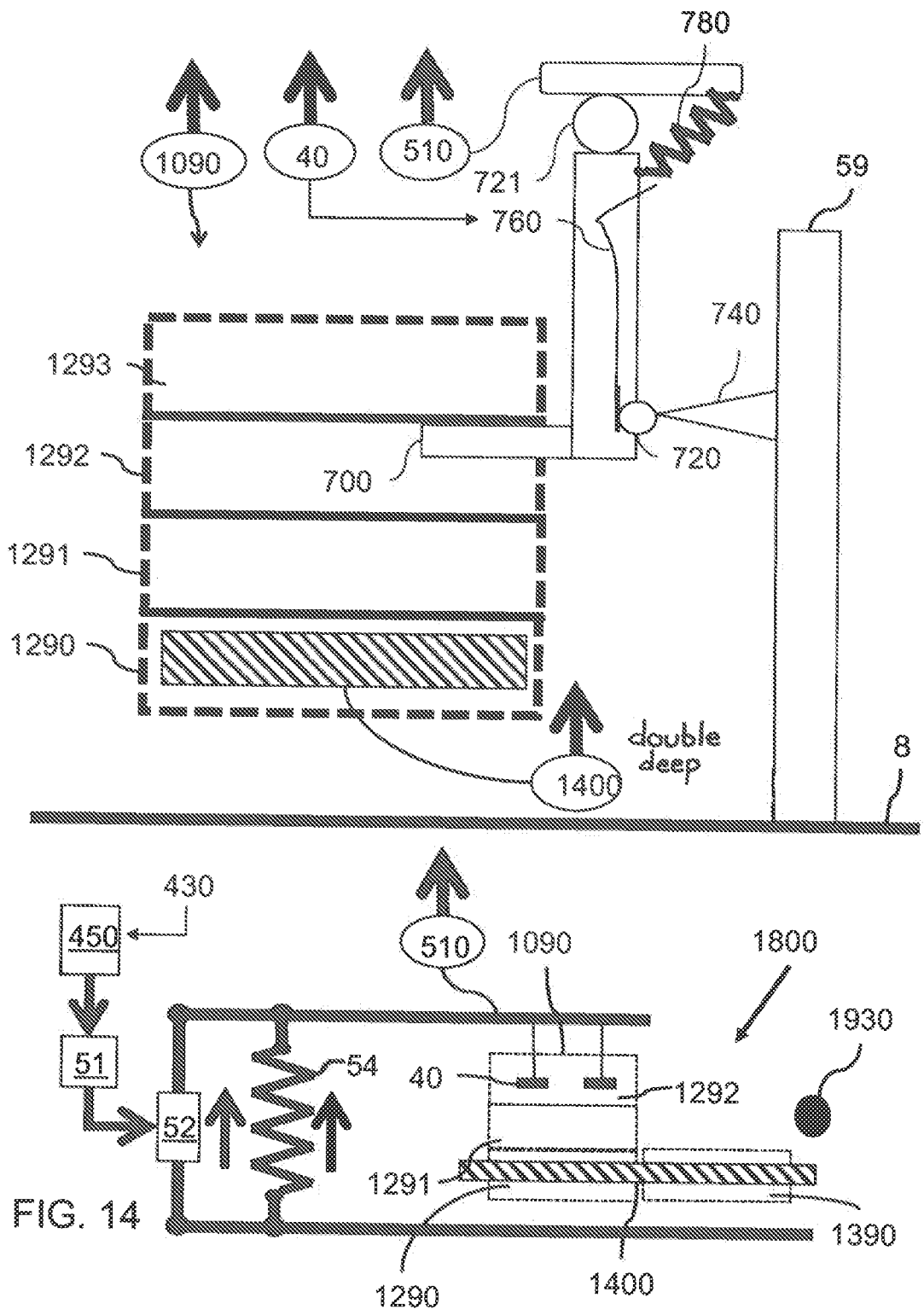

Referring now to FIG. 14, the next operational sequence is depicted. The spring assembly 54 is configured to apply the lifting force to the movable frame 510, and the lifting force is not large enough to lift the movable frame 510 vertically upwards away from the work surface 8 while the movable frame 510 remains engaged (latched) with the pallet stack 1090 (via the dogs 700 of the latches 40), because the weight of the pallet stack 1090 overcomes the lifting force applied by the spring assembly 54 to the movable frame 510. The lifting force provided by the spring assembly 54 is not large enough to vertically lift the combined weight of the movable frame 510 and the pallet stack 1090 upwardly and away from the work surface 8. However, once the double-deep pallet transporter 1400 is engaged with the bottom pallet (second in-line pallet) 1290 and the first in-line pallet 1390, the double-deep pallet transporter 1400 is used to apply just enough vertical lifting force to the pallet stack 1090 and the bottom (second in-line) pallet 1290 in such a way that the combination of the lifting force provided by the spring assembly 54 and the lifting force provided by the double-deep pallet transporter 1400 (in combination) are applied to the combination of the movable frame 510 and the pallet stack 1090. The combined lifting force from both the spring assembly 54 and the double-deep pallet transporter 1400 is enough to vertically lift the combination of the movable frame 510 and the pallet stack 1090 and the bottom (second in-line) pallet 1290 upwardly away from the work surface 8. Therefore, the movable frame 510 is configured to movably hold, at least in part, the pallet stack 1090 between the pallet-storage position (example, higher off the ground) and the pallet-dispensation position (example, lower on the ground). The movable frame 510 is also configured to hold the pallet stack 1090 relative to the double-deep pallet transporter 1400 in such a way that the double-deep pallet transporter 1400 is permitted to vertically lift the pallet stack 1090 as the movable frame 510 is provided with vertical-lift assistance; the vertical-lift assistance may be provided, for example, from the spring assembly 54 or counter-weight (not shown). In accordance with an option, the raising device (such as the spring assembly 54 or counter-weight (not shown)) is configured to vertically lift the movable frame 510 away from the pallet-dispensation position (example, lower on the ground) toward the pallet-storage position (higher above the ground) while the double-deep pallet transporter 1400 is permitted to vertically lift the pallet stack 1090. In accordance with an option, the raising device (such as the spring assembly 54 or counter-weight (not shown)) may be electrically unpowered if so desired. For the case where the riser assembly or the spring assembly 54 is electrically unpowered, a technical advantage is that the apparatus may operate relatively faster than for the case where electrical power is used to vertically lift the movable frame 510.

The hydraulic valve 51 is in the open state. The double-deep pallet transporter 1400 vertically lifts the bottom pallet (second in-line pallet) 1290 and the first in-line pallet 1390 away from the work surface 8, thus lifting the pallet stack 1090 and the movable frame 510 vertically above the work surface 8 because movable frame 510 is latched to the pallet stack 1090 by way of the latch 40. The double-deep pallet transporter 1400 does the work of vertically lifting the pallet stack 1090. The movable frame 510 pulls on the rod of the hydraulic cylinder 52, and since the hydraulic valve 51 is placed in the open state, then the hydraulic fluid flows from the hydraulic reservoir 450 to the hydraulic cylinder 52, thus filling the hydraulic cylinder 52 with additional hydraulic fluid. As the pallet stack 1090 is moved vertically upward, and the latch 40 continues to contact the bottom section of the pallet 1292 as the pallet stack 1090 is vertically lifted away from the work surface 8. As depicted, for the case where the pallet stack 1090 is vertically lifted, the latch 40 transfers the weight of the movable frame 510 to the pallet 1292 of the pallet stack 1090; and for this case, the weight of the pallet stack 1090 is fully supported by the double-deep pallet transporter 1400. The arm 720 is also vertically moved while the cam roller 740 remains stationary relative to the movement of the cam arm 720.

Figure 15:
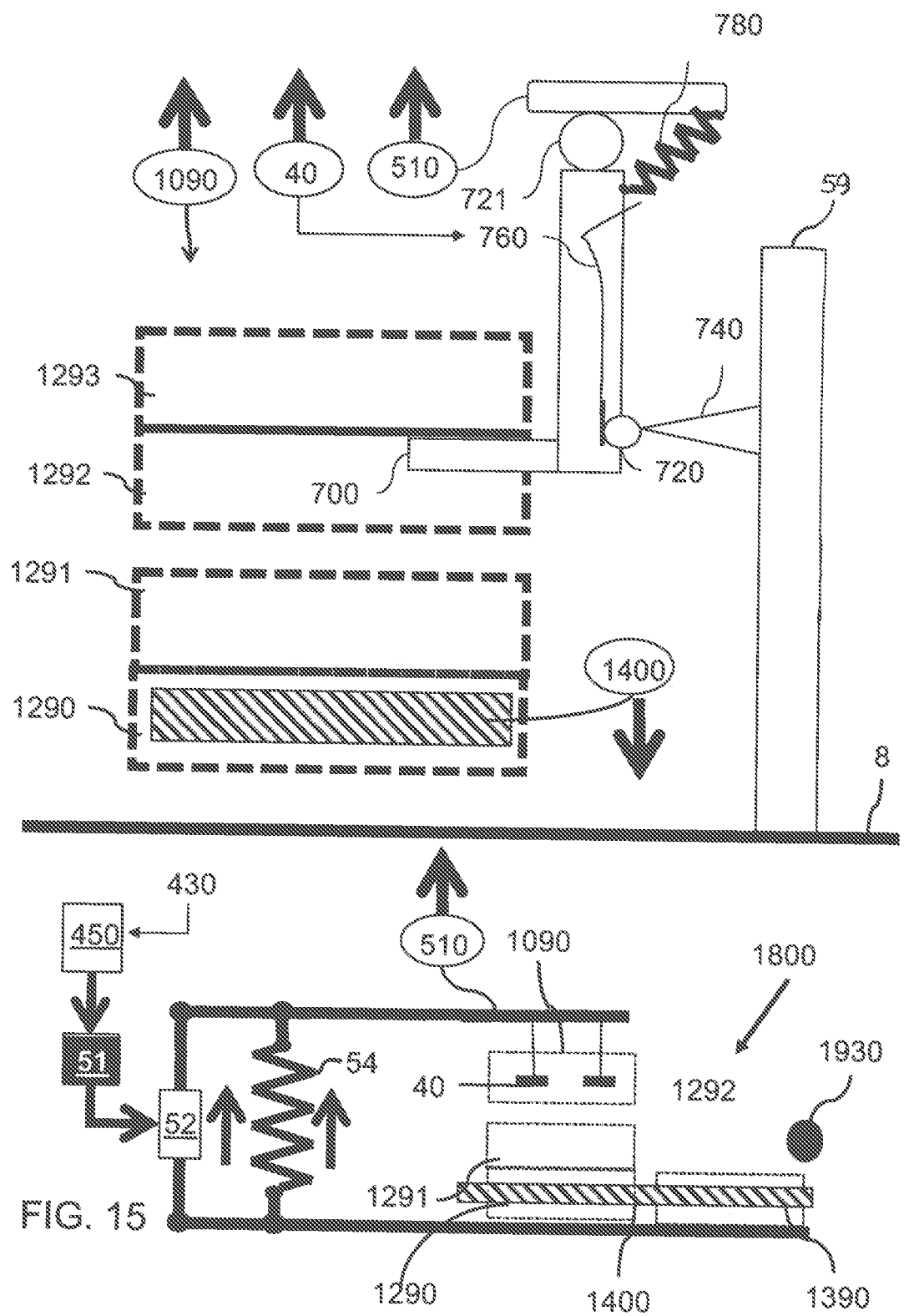

Referring now to FIG. 15, the next operational sequence is depicted. The hydraulic valve 51 is placed in a closed state. In this case, the fluid cannot flow out from the hydraulic cylinder 52, and so the hydraulic cylinder 52 is locked up and cannot move. The movable frame 510, as well, cannot move since the rod of the cylinder cannot move. Now, the double-deep pallet transporter 1400 moves the bottom (second in-line) pallet 1290, the top pallet 1291, and first in-line pallet 1390 vertically down and away from the pallet stack 1090, vertically downward towards the work surface 8. This is done in such a way that a clearance gap is formed between the top of top pallet 1291 and the bottom of pallet 1292. The double-deep pallet transporter 1400 lowers the bottom (second in-line) pallet 1290, the top pallet 1291, and the first in-line pallet 1390 while pallet 1292 remains latched to the movable frame 510, with the rest of the pallet stack 1090 resting on pallet 1292. The weight of the movable frame 510 and the pallet stack 1090 are supported by the hydraulic cylinder 52. Since there is no fluid flowing from the hydraulic cylinder 52, the hydraulic cylinder 52 is locked, and keeps the movable frame 510 from falling vertically toward the work surface 8. For the case depicted in FIG. 15, gravity cannot overcome the force of the hydraulic cylinder 52 that acts to push or to maintain the position of the movable frame 510 in a stationary position relative to the stationary support frame 59. Thus, the movable frame 510 and pallet stack 1090 remain in static position, hanging above the work surface 8.

Figure 16:
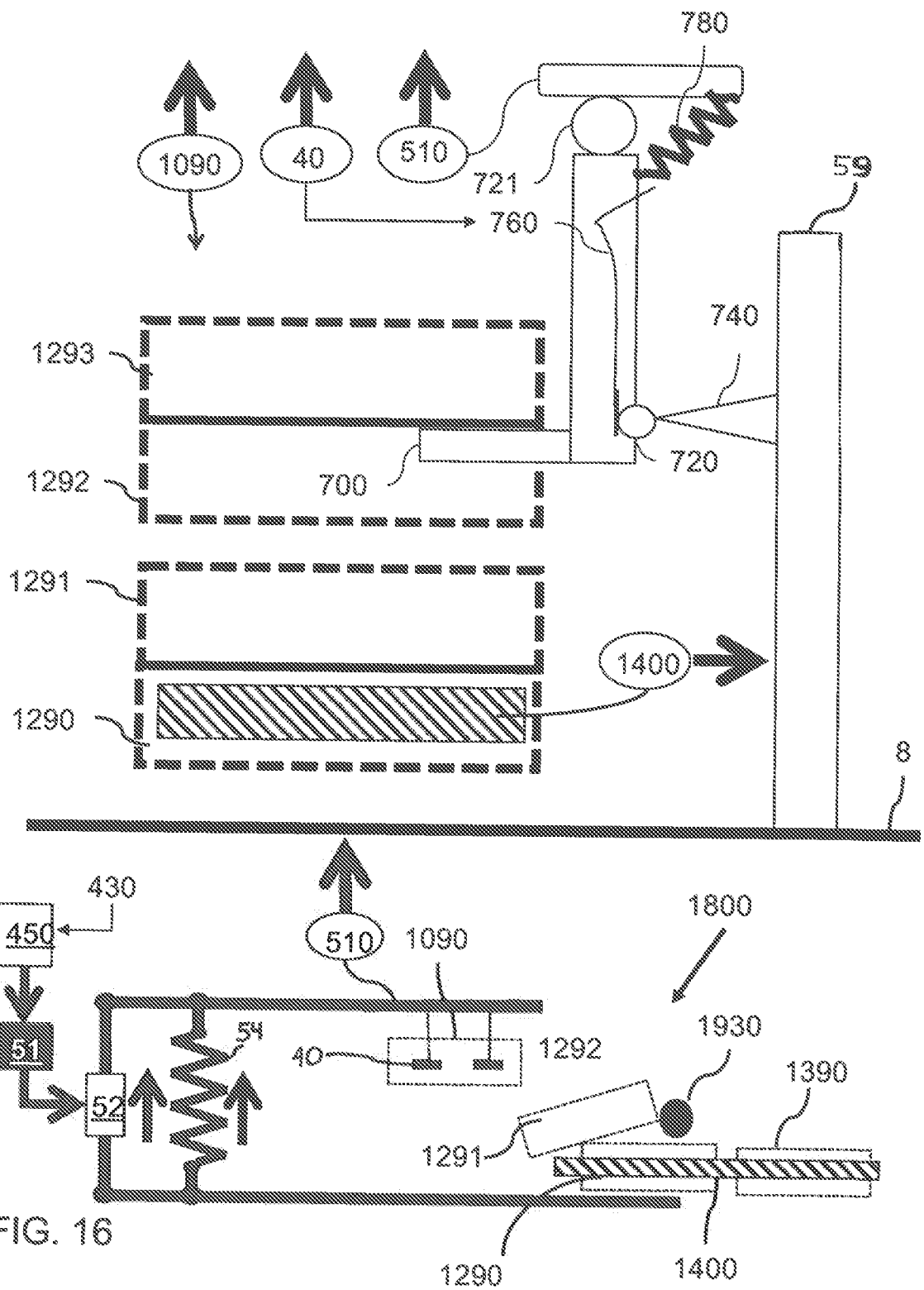

Referring now to FIG. 16, the next operational sequence is depicted. The hydraulic valve 51 remains in the closed state, there is no flow of fluid between the hydraulic cylinder 52 and the hydraulic reservoir 450, and the hydraulic cylinder 52 remains in a locked state and supports the weight of the movable frame 510 and the pallet stack 1090 while the double-deep pallet transporter 1400 is moved away from the movable frame 510. As the double-deep pallet transport 1400 is moved away from the movable frame 510, the blocker 1930 blocks the passage of the top pallet 1291 from the pallet blocking apparatus 1800. In this example as the double-deep pallet transporter 1400 is moved away from the movable frame 510, the top pallet 1291 contacts the blocker 1930 and is prevented from passing through the pallet blocking apparatus 1800. The top pallet 1291 is slidingly separated from the bottom pallet 1290 as the double-deep pallet transporter 1400 is removed from the apparatus. Once the double-deep pallet transporter 1400 is fully removed from the system, the top pallet 1291 will become the next first in-line pallet 1390 and will be stored in the pallet storage area 2004 of the pallet blocking apparatus 1800.

A photocell (not depicted and known) may be used to detect that the double-deep pallet transporter 1400 is no longer present below the movable frame 510. The signal from the photocell may be used to initiate the opening of the hydraulic valve 51 (depicted in FIG. 17). As depicted in FIG. 16, the movable frame 510 is held in the static (stationary) position above ground because the hydraulic valve 51 is closed, thus locking out movement of the movable frame 510.

Figure 17:
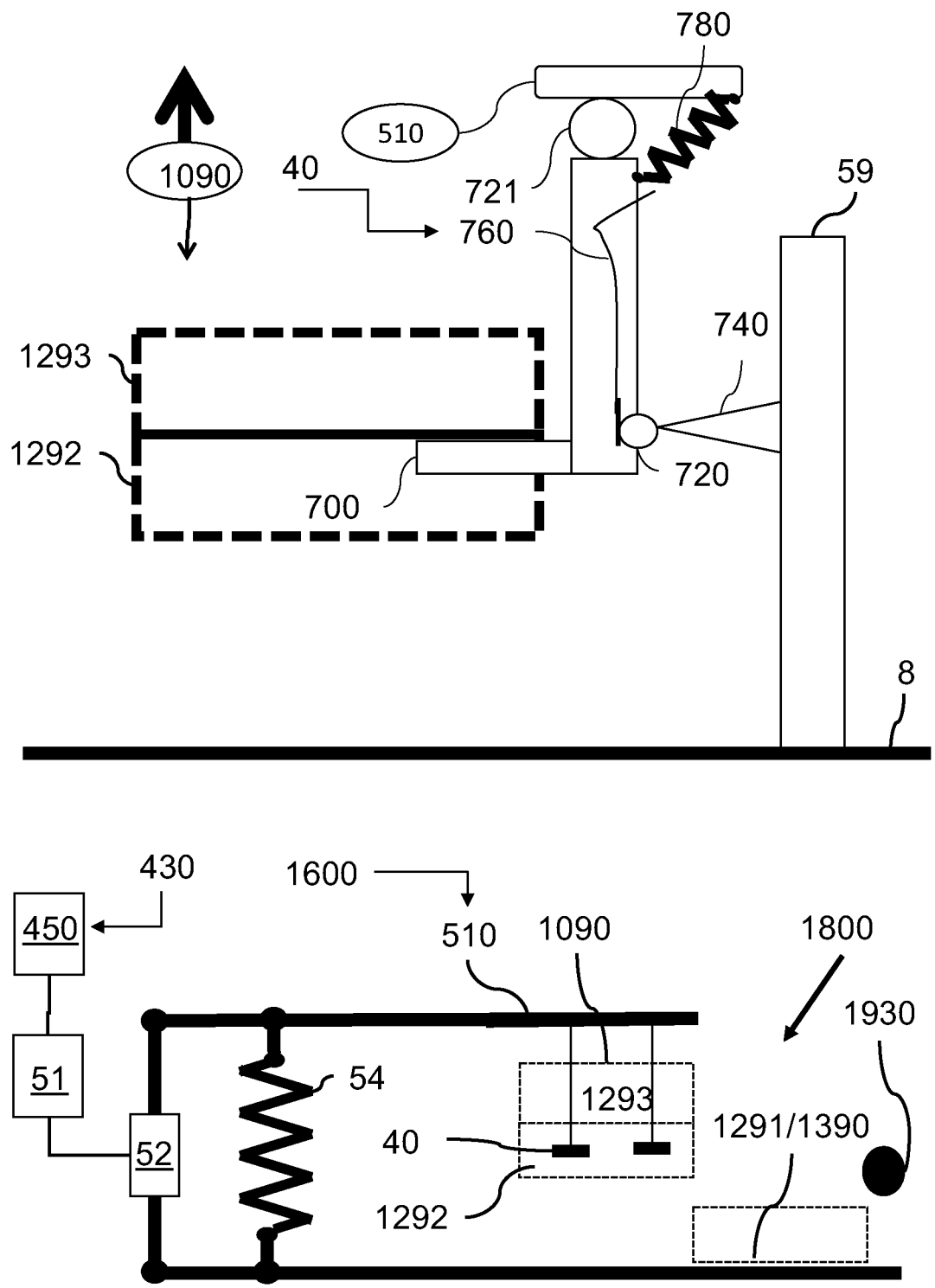

Referring now to FIG. 17, the next operational sequence is depicted. The hydraulic valve 51 is placed in the open state, and the weight of the movable frame 510 and the pallet stack 1090 push against the rod of the hydraulic cylinder 52 and thus the hydraulic fluid in the hydraulic cylinder 52 is urged to flow toward the hydraulic valve 51, through the hydraulic valve 51 and into the hydraulic reservoir 450. The hydraulic valve 51 presents a restricted orifice to the flow of hydraulic fluid, thus slowing down or moderating the flow of hydraulic fluid from the hydraulic cylinder 52 to the hydraulic reservoir 450. In the this manner, resistance or an opposing force is applied to the downward movement of the movable frame 510 and the pallet stack 1090 thus slowing down the vertical decent of the movable frame 510 and the pallet stack 1090 toward the work surface 8, thereby avoiding free fall under gravity. The opposing force provided by the hydraulic cylinder 52 cannot overcome the force of gravity acting on the movable frame 510 and the pallet stack 1090.

Once the movable frame 510 vertically falls toward the work surface 8, the movable frame pushes on the spring assembly 54 and thus the movable frame 510 compresses the spring assembly 54. In this case, the spring assembly 54 stores energy (becomes compressed). The spring assembly 54 becomes compressed and stores potential kinetic energy received from the movable frame 510. The potential energy stored by the spring assembly 54 will be used (at least in part) in FIG. 18 to vertically lift the movable frame 510 away from the work surface 8. The spring assembly 54 is used later in the process of de-latching and positioning the movable frame 510 as depicted in FIG. 18. In another embodiment, a counter-weight is used to store the potential kinetic energy for use to vertically lift the movable frame 510 away from the work surface 8, and in the process of de-latching and positioning the movable frame 510.

In accordance with one option, the hydraulic valve 51 is configured such that the hydraulic valve 51 is placed in the open state only when both the bottom pallet 1290 and top pallet 1291 and the double-deep pallet transporter 1400 become completely cleared from the movable frame 510. With this option, the operator of the double-deep pallet transporter 1400 may take their time to remove the double-deep pallet transporter 1400 away from the movable frame 510 since the movable frame 510 for this case remains static or stationary (hanging above the work surface 8) until the hydraulic valve 51 is placed in the open state.

In accordance with another option, the hydraulic valve 51 is configured to be placed in the open state automatically once the double-deep pallet transporter 1400 is clear of the movable frame 510. It is understood that the movable frame 510 is allowed to descend to ground (in a controlled free fall) because fluid flows from the hydraulic cylinder 52 to the hydraulic reservoir 450 since the hydraulic valve 51 is placed in the open condition. As the movable frame 510 vertically descends toward the work surface 8, the latches 40 become de-latched from pallet 1292 as the pallet stack 1090 and movable frame 510 are moved toward the work surface. The latches 40 pivot away from pallet 1292. In the example depicted in FIG. 18, the latches 40 visible in the bottom of the figure would pivot towards the viewer while the latches 40 on the opposite side of the pallet stack 1090 would pivot away from the viewer. Specifically, the cam follower 760 allows the cam roller 740 to pivot the arm 720. The cam follower 760 causes automatic de-latching of the latch 40 as the movable frame 510 moves or descends toward the work surface 8. The spring assembly 54 has stored potential energy, ready to be used to lift the movable frame 510 once the latches 40 are placed in the un-latched condition (as depicted in FIG. 18). Once the latches 40 are placed in the un-latched state, the movable frame 510 is pushed by the spring assembly 54 vertically upwardly and away from the work surface 8.

Referring now to FIG. 19, the next operational sequence is depicted. The spring assembly 54 has stored potential energy, ready to be used to lift the movable frame 510 once the latches 40 are placed in the un-latched condition (as depicted in FIG. 18). Once the latches 40 are placed in the un-latched state, the movable frame 510 is pushed by the spring assembly 54 vertically upwardly and away from the work surface 8. Once de-latching occurs, the spring assembly 54 changes state from the compressed state to neutral state and thus the spring assembly 54 expends energy to lift the movable frame 510 vertically upwardly away from the work surface 8. The movable frame 510 moves vertically upward by force received from spring assembly 54. The spring assembly 54 expends kinetic energy that moves the movable frame 510 upwardly while the pallet stack 1090 remains stationary on the work surface 8. Once the movable frame 510 moves vertically up and away from the work surface 8, the latches 40 securely engage pallet 1293, and then the pallet 1291 and pallet 1292 are available for removal from the pallet stack 1090. Furthermore, the first in-line pallet 1390 is also available to be removed.

The spring assembly 54 reaches the neutral state (not biased or not storing potential energy). The hydraulic valve 51 remains in the open state so that hydraulic fluid is ready to flow between the hydraulic cylinder 52 and the hydraulic reservoir 450 for the next dispensing cycle. The movable frame 510 held in a static position. The movable frame 510 remains at rest on the pallet stack 1090, and the pallet stack 1090 rests on the work surface 8. The cycle is ready to begin for the removal of the now top pallet 1291, now bottom pallet (and now second in-line pallet) 1290, and now first in-line pallet 1390 once required to do so.

To summarize, in view of FIGS. 11 to 19, the apparatus includes the movable frame 510 configured to movably hold, at least in part, the pallet stack 1090 between the pallet-storage position and the pallet-dispensation position. The movable frame 510 is also configured to hold a pallet 1292 from the pallet stack 1090 relative to a double-deep pallet transporter in such a way that the double-deep pallet transporter 1400 is permitted to vertically lift the pallet stack 1090 and allow the movable frame 510 to travel upwards because of the spring force or other force provided by another device, for example, a counter-weight. The apparatus also includes a dampening device configured to dampen, at least in part, free-fall descent of the movable frame 510 under influence of gravity from the pallet-storage position toward the pallet-dispensation position. Since the double-deep pallet transporter 1400 lifts the pallet stack 1090 by the bottom (second in-line) pallet 1290, a taller instance of the pallet stack 1090 may be possible. In accordance with an option, the apparatus is adapted such that the movable frame 510 is configured to movably hold the pallet stack 1090 having the bottom (second in-line) pallet 1290, and top pallet 1291 between the pallet-storage position and the pallet-dispensation position without consuming electrical energy, and the dampening device is configured to dampen free-fall descent of the movable frame 510 under influence of gravity from the pallet-storage position toward the pallet-dispensation position without consuming electrical energy.

In general terms, in view of FIGS. 11 to 19, the blocking apparatus 1800 cooperates with the pallet dispensing apparatus 2. The blocking apparatus 1800 and the pallet dispensing apparatus 2 may work together as a system, or be part of an apparatus. The pallet dispensing apparatus includes a movable frame 510 configured to movably hold, at least in part, a pallet stack 1090 between a pallet-storage position and a pallet-dispensation position. The movable frame 510 is also configured to hold a pallet 1292 of the pallet stack 1090 relative to a double-deep pallet transporter 1400 in such a way that the double-deep pallet transporter 1400 is permitted to vertically lift the pallet stack 1090, by the bottom (second in-line) pallet 1290, and the first in-line pallet 1390 and allow the movable frame 510 to travel upwards because of the spring force or other force provided by another device, such as a counter-weight. The apparatus includes a pallet blocking apparatus configured to prevent a top pallet 1291 from being removed from the apparatus, thereby allowing for two in-line pallets to be dispensed from the apparatus.

Figure 20:
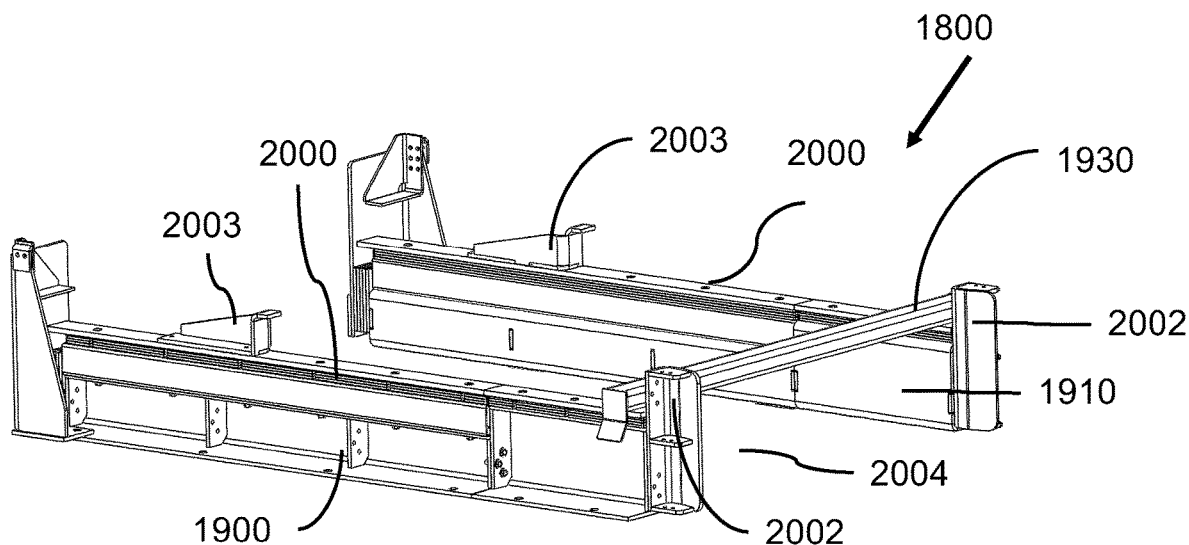
FIG. 20 depicts a perspective view of a second embodiment pallet blocking apparatus.
Figure 21A:
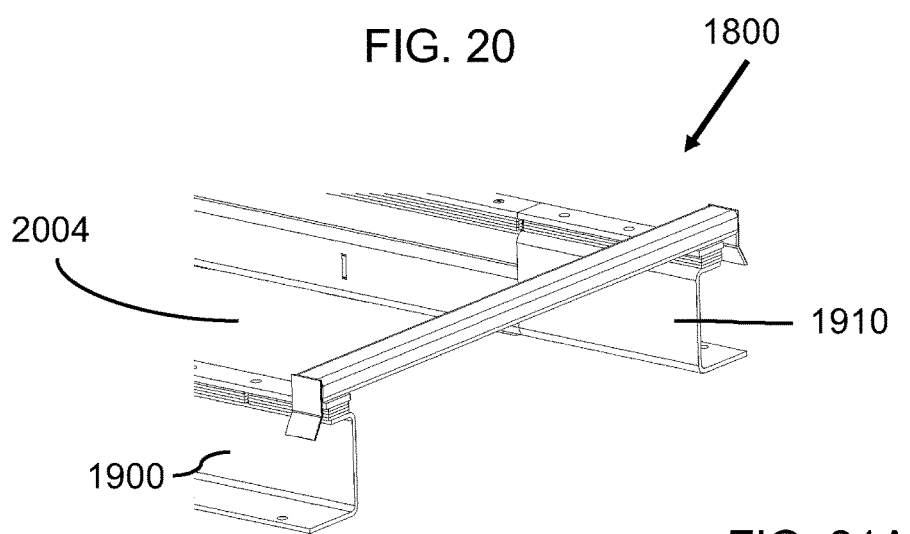
FIG. 21A depicts a partial perspective view of of the embodiment of FIG. 20.
Figure 21B:
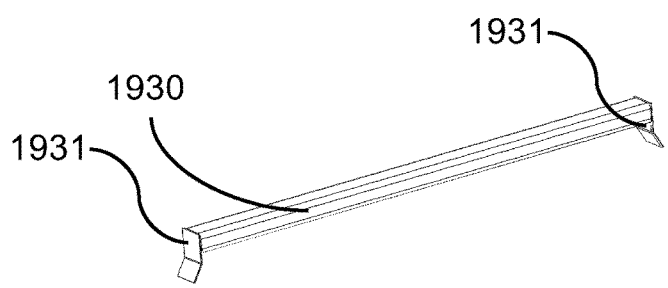
FIG. 21B depicts an embodiment blocker bar.
Figure 22:
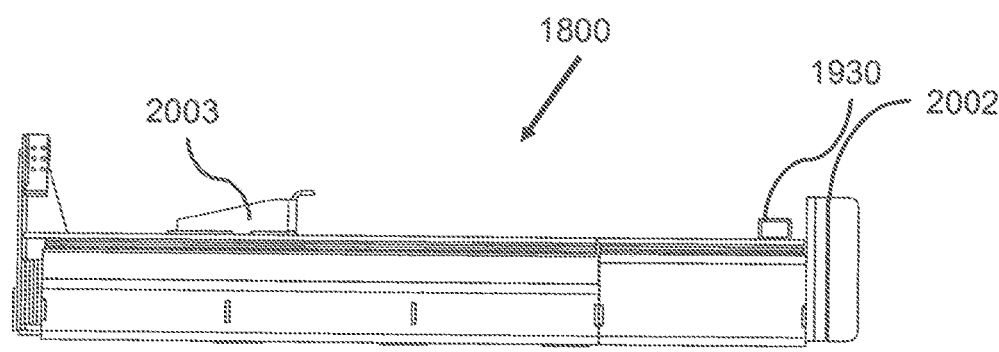
FIG. 22 depicts a side view of the embodiment of FIG. 20.
Figure 23:
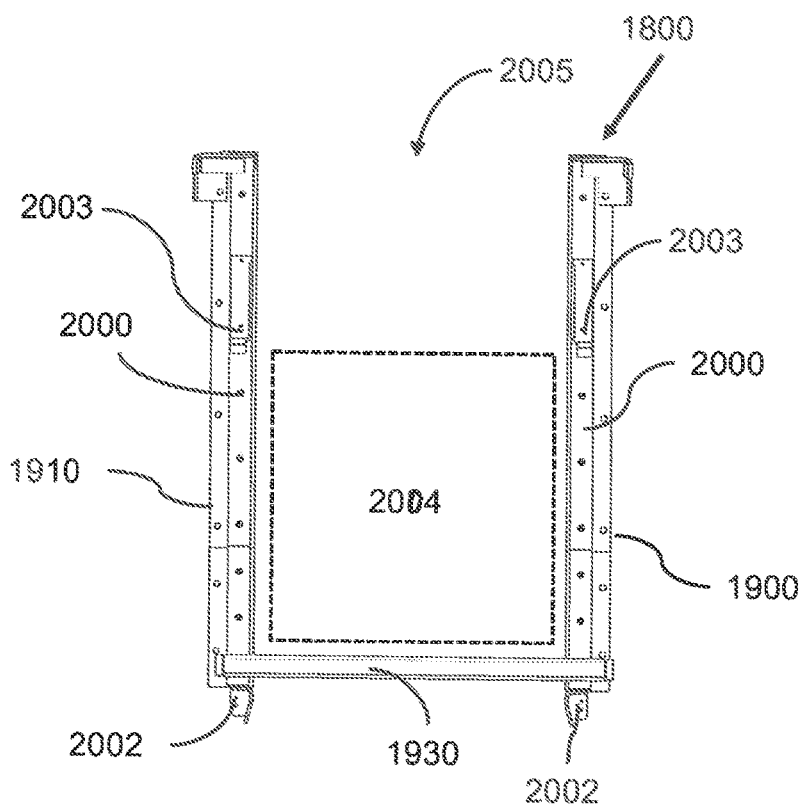
FIG. 23 depicts a top down view of the embodiment of FIG. 20.

Referring now to FIG. 20-FIG. 23, FIG. 20-FIG. 23 depict an alternate embodiment of the pallet blocking apparatus 1800. FIG. 20 depicts a perspective view of the pallet blocking apparatus 1800. FIG. 21A depicts a partial perspective view of the pallet blocking apparatus 1800 of FIG. 20. FIG. 21B depicts an embodiment blocker 1930 used in the pallet blocking apparatus of FIG. 21A. FIG. 22 depicts a side view of the pallet blocking apparatus 1800 of FIG. 20. FIG. 23 depicts a top view of the pallet blocking apparatus of FIG. 20.

In this embodiment a blocker 1930 is configured to slidingly move on the top of the first wall 1900 and second wall 1910 of the pallet blocking apparatus 1800. The first wall 1900 and second wall 1910 are for raising the blocker 1930. The blocker 1930 has flanges 1931 on either side of the blocker 1930 and the flanges cooperate with first wall 1900 and second wall 1910 to keep the blocker 1930 in place. The advantage of this embodiment are that the blocker 1930 is installable and removable by hand and without tools, and allows for easy repair and access to the pallet dispenser 2/1600. This embodiment of the blocker 1930 is affordable and simple to manufacture. The sliding bar allows a double deep pallet transporter 1400 to enter, at least in part, the pallet blocking apparatus 1800. In the embodiment depicted in FIG. 20-FIG. 23 front blocker stops 2003 and rear blocker stops 2002 are provided to prevent the blocker 1930 from sliding off the front or the back of the first wall 1900 and second wall 1910 of the pallet blocking apparatus 1800. The blocker 1930 slides from the front of the pallet blocking apparatus 1800 to the back of the pallet blocking apparatus 1800 and vice versa. The front blocker stop 2003 allows the double-deep pallet transporter 1400 to push the blocker 1930 until the blocker 1930 contacts the front blocker stop 2003. This allows the the pallet transporter 1400 to enter, at least in part, the pallet blocker apparatus 1800. The pallet transporter 1400 may enter, at least in part, the pallet blocker apparatus 1800 when both a first-inline pallet 1390 is present in the pallet storage area 2004 and when there is no pallet present in the pallet storage area 2004. When a first in-line pallet 1390 is present, the pallet transporter 1400 will push the first in-line pallet 1390 so that it abuts the bottom (second in-line) pallet 1290. When there is no first in-line pallet 1390, the blocker 1390 in cooperation with the front blocker stop 2003 will stop the pallet transporter.

In another embodiment, the first wall 1900 and second wall 1910 are not attached to the pallet dispenser 2. The first wall 1900 and second wall 1910 may be bolted into the ground or work surface 8. The first wall 1900 and second wall 1910 are not attached to each other.

In another embodiment, the blocker 1930 is fixed in position. For example, the blocker 1930 may be fixed at the position shown in FIG. 20. Recall, that the blocker 1930 may comprise various embodiments as discussed above.

In some embodiments an anti-friction coating or material 2000 is applied to the top of the first wall 1900 and the top of the second wall 1910 that is in contact with the blocker 1930. This allows the blocker 1930 to slide with less friction when compared to embodiments where no anti-friction coating or material 2000 is applied. The anti-friction coating/material 2000 may also be used to reduce the noise of the blocker 1930 sliding along the top of the first wall 1900 and the top of the second wall 1910. In an embodiment the material 2000 is an ultra high molecular weight (UHMW) plastic. For example, polyethylene.

The pallet blocking apparatus 1800 may be used in both a primed state (i.e., with a pallet in the pallet storage area 2004 as shown earlier) and in an unprimed state (i.e., with no pallet in the pallet storage area 2004). Referring to FIGS. 11 to 19, the unprimed state will not have a first in-line pallet 1390 in the pallet storage area 2004. Therefore, as shown in FIG. 16 minus the first in-line pallet 1390, after the bottom (second in-line) pallet 1290 is withdrawn and the top pallet 1291 is in the pallet storage area 2004, the pallet transporter 1400 re-enters the pallet blocking apparatus 1800 again to pick up the now first in-line pallet 1390 (previously top pallet 1291) in the pallet storage area 2004.

Figure 24A:
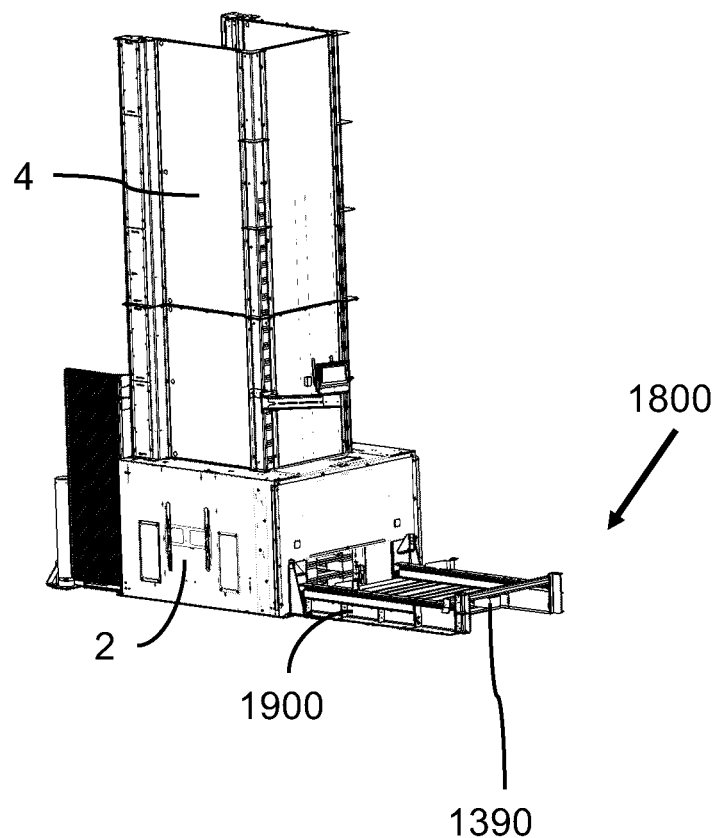
FIG. 24A depicts a perspective view of an embodiment pallet dispensing apparatus with a pallet blocking apparatus.
Figure 24B:
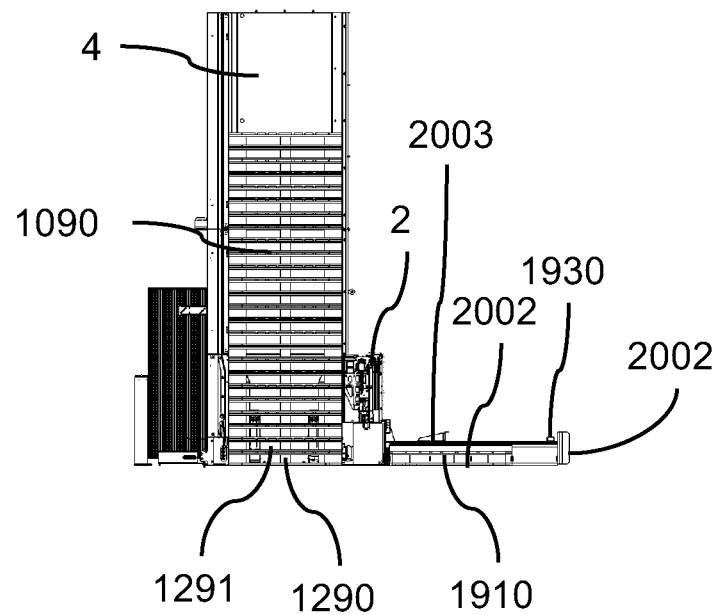
FIG. 24B depicts a side view of the embodiment of FIG. 24A.
Figure 24C:
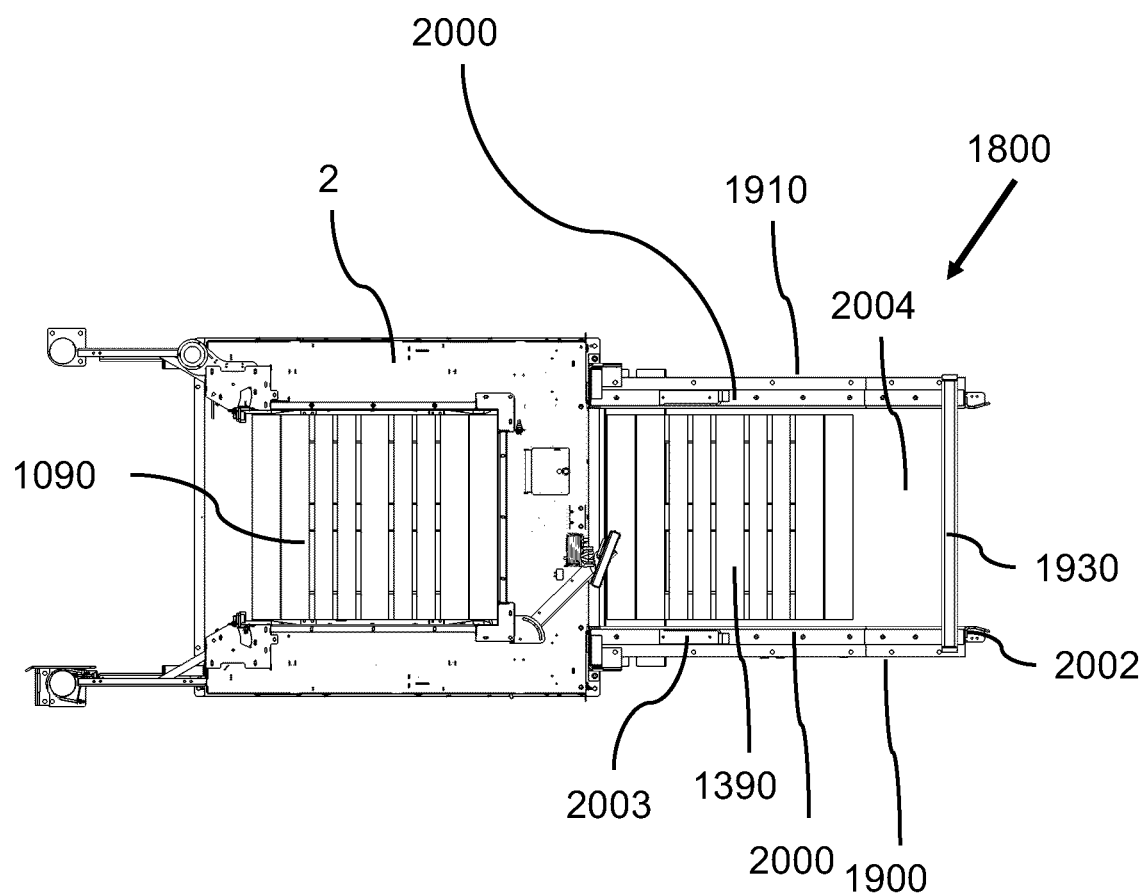
FIG. 24C depicts a top down view of the embodiment of FIG. 24A.
Figure 25:
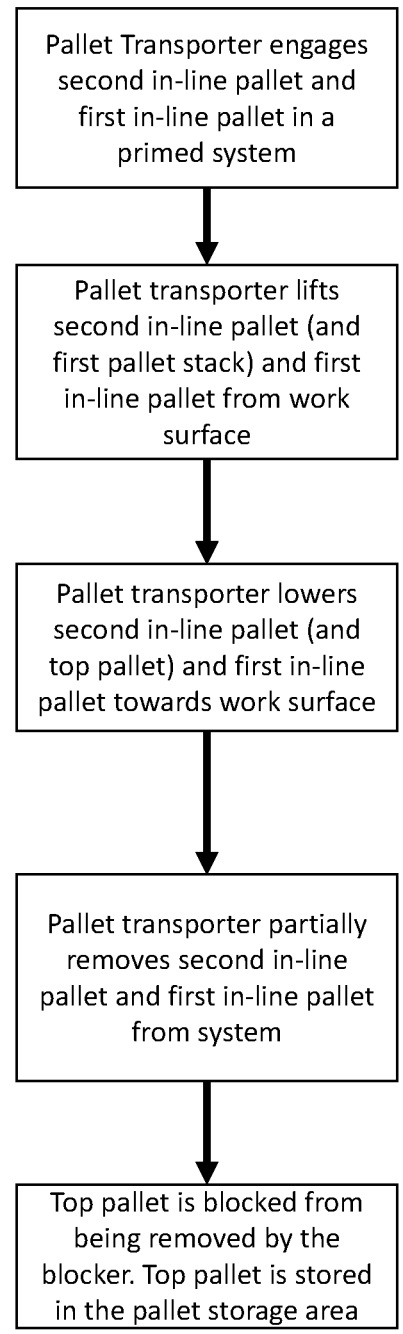
FIG. 25 is a flowchart depicting a method for dispensing a pallet from a primed pallet dispenser.

Referring now to FIG. 24A-FIG. 24C, a perspective view, side view, and top down view of an embodiment system having a pallet dispenser 2 and a pallet blocking apparatus 1800 is depicted. In this embodiment, a blocking apparatus 1800 similar to the one depicted in FIG. 20-FIG. 23 is used with a pallet dispenser to dispense two in-line pallets from the pallet dispenser.

In this embodiment the pallet blocker 1930 is configured to slide along the top of the first side and the second side of the pallet blocking apparatus 1800. This allows for an operator to easily access the pallet storage area 2004 for maintenance or to remove a stuck or broken pallet. It will also be appreciated that the sliding pallet blocker 1930 would allow for a pallet transporter 56 to get closer to the pallet dispenser 2 when the pallet transporter 56 engages a pallet.

Figure 26:
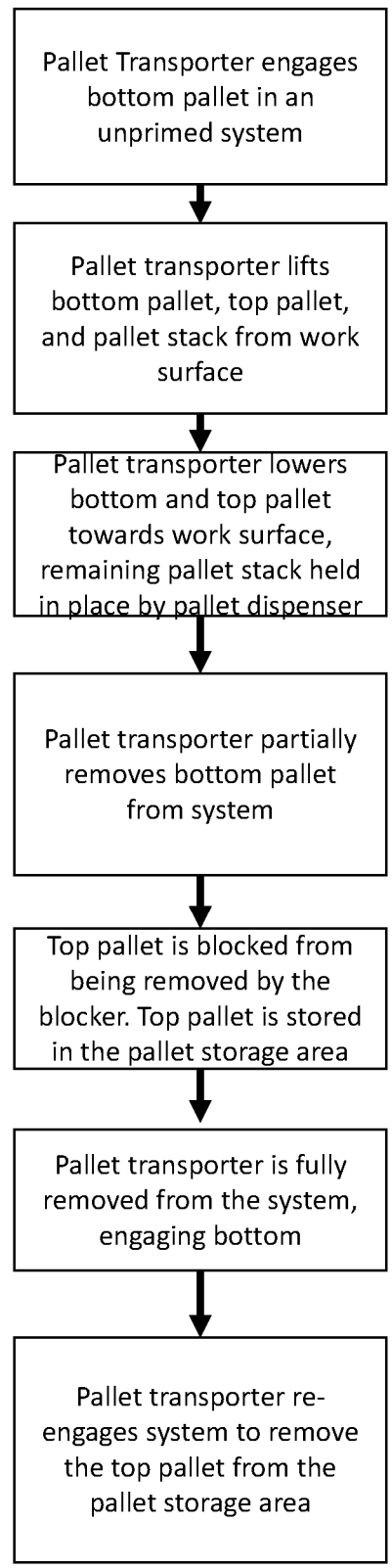
FIG. 26 is a flowchart depicting a method for dispensing a pallet from an unprimed pallet dispenser.

Referring now to FIG. 26, in this example method the double-deep pallet transporter 1400 would receive one pallet in the first engagement of the unprimed apparatus or system. In this first engagement, the double deep pallet transporter 1400 would receive the bottom pallet 1290 and the top pallet 1291, and the top pallet 1291 is stored in the pallet staging area 2004 once the bottom pallet 1290 is removed from the apparatus or system because the top pallet 1291 is blocked by the blocker 1930. Operationally this is nearly identical to the operational steps and method described earlier in the primed system and FIG. 25, with the difference that the system is unprimed (that is, there is no pallet in the pallet storage area 2004).

Once the bottom pallet 1290 has been removed from the apparatus or system, the apparatus system is effectively primed—that is, a pallet (previously the top pallet 1291) is staged in the pallet storage area 2004 of the pallet blocking apparatus 1800.

The double deep pallet transporter, at this point engaging one of two pallets, can then re-engage the apparatus or system to obtain/engage the second pallet. In this second engagement the double deep pallet transporter only engages the pallet that is staged in the pallet storage area 2004. Thus, the double deep pallet transporter 1400 has engaged two pallets, in-line, once it has engaged the pallet that is staged in the pallet storage area 2004. The apparatus or system is then in an unprimed state once again once the pallet in the pallet storage area 2004 has been removed.

The following clauses are offered as further description of the examples of the apparatus. Any one or more of the following clauses may be combinable with any another one or more of the following clauses and/or with any subsection or a portion or portions of any other clause and/or combination and permutation of clauses. Any one of the following clauses may stand on its own merit without having to be combined with any other clause or any portion of any other clause, etc. CLAUSE 1: an apparatus of any clause in this paragraph having a pallet dispenser 2 for dispensing a stack of pallets including a second in-line pallet and a top pallet; and a pallet blocking apparatus 1800 positioned in-line and adjacent to the pallet dispenser 2, the pallet blocking apparatus having a pallet blocker 1930 for blocking a top pallet from the dispensed stack of pallets, and a pallet storage area for storing a first in-line pallet, wherein: once a double-deep pallet transporter has engaged the first in-line pallet and the second in-line pallet, the first in-line pallet and the second in-line pallet are dispensed from the pallet dispensing apparatus while the top pallet from the dispensed stack of pallets is blocked by the blocker 1930 from passing through the pallet dispensing apparatus, the top pallet (now first in-line pallet) being stored in the pallet storage area. CLAUSE 2: an apparatus of any clause in this paragraph wherein the pallet blocker 1930 pivots around a hinge on the pallet blocking apparatus 1800 so that the storage area for storing pallets is accessible. CLAUSE 3: an apparatus of any clause in this paragraph wherein the pallet blocker 1930 slides on the pallet blocking apparatus 1800 so that the storage area for storing pallets is accessible. CLAUSE 4: an apparatus of any clause in this paragraph, the apparatus having a pallet blocking apparatus 1800 for use with a pallet dispenser 2 of any clause in this paragraph having a first wall; a second wall; a pallet blocker 1930 for blocking a pallet in a pallet stack, the pallet blocker 1930 spanning, at least in part, the first wall and the second wall; and a pallet storage area for storing a pallet so that a pallet dispenser can engage and remove the pallet stored in the pallet storage area. CLAUSE 5: an apparatus of any clause in this paragraph wherein the pallet blocker 1930 is pivotingly attached to the first wall and the second wall so that the pallet blocker 1930 can pivot away from an interior space defined by the first wall and the second wall so that the interior space can be accessed. CLAUSE 6: an apparatus of any clause in this paragraph wherein the pallet blocker 1930 further includes a counterweight so that, once pivoted, the pallet blocker 1930 is returned to its initial position by gravity. CLAUSE 7: an apparatus of any clause in this paragraph wherein the pallet blocker 1930 is in sliding communication with a top surface of the first wall and a top surface of the second wall, the top surface of the first wall and the top surface of the second wall having a blocker stop 2002 to prevent the pallet blocker 1930 from sliding off the top surface of the first wall, the top surface of the second wall, or both. CLAUSE 8: an apparatus of any clause in this paragraph wherein the top surface of the first wall and the top surface of the second wall have an anti-friction coating/material to reduce frictional forces on the pallet blocker 1930 due to sliding. CLAUSE 9: an apparatus of any clause in this paragraph wherein the pallet blocking apparatus is positioned adjacent to and in-line with the pallet dispenser so that a pallet transporter can enter, at least in part, both the pallet blocking apparatus and the pallet dispenser. CLAUSE 10: A method of any clause in this paragraph, the method including engaging a first in-line pallet in a pallet storage area of a pallet blocking apparatus and a second in-line pallet in a pallet dispenser with a pallet transporter, the second in-line pallet being a bottom pallet of a pallet stack and the bottom pallet having a top pallet immediately above the second in-line pallet; lifting the first in-line pallet and the second in-line pallet with the pallet transporter from a work surface; lowering the first in-line pallet, the second in-line pallet, and the top pallet with the pallet transporter towards the work surface, the pallet stack being held by the pallet dispensing apparatus; and removing the first in-line pallet, the second in-line pallet, and the top pallet from the pallet dispensing apparatus, the top pallet being blocked by the pallet blocking apparatus and stored in the pallet storage area of the pallet blocking apparatus; wherein both the first in-line pallet and the second in-line pallet are on a work surface. CLAUSE 11: A method of any clause in this paragraph further comprising pivoting a blocking bar of the pallet blocking apparatus to access the pallet storage area. CLAUSE 12: A method of any clause in this paragraph further comprising sliding a blocking bar of the pallet blocking apparatus to access the storage area. CLAUSE 13: A method of any clause in this paragraph including engaging a bottom pallet in a pallet stack held by a pallet dispensing apparatus, the bottom pallet having a top pallet immediately above the bottom pallet; lifting the bottom pallet with the pallet transporter from the work surface; lowering the bottom pallet and the top pallet with the pallet transporter towards the work surface, the remaining pallet stack being held by the pallet dispensing apparatus; removing the bottom pallet from the pallet dispensing apparatus, the top pallet being blocked by a pallet blocking apparatus from being removed from the pallet blocking apparatus and stored in a pallet storage area as the bottom pallet is removed from the pallet dispensing apparatus; engaging the top pallet in the pallet storage area with the pallet transporter so that the top pallet is adjacent to the bottom pallet on the pallet transporter; and removing the top pallet from the pallet dispenser. CLAUSE 14: A method of any clause in this paragraph further comprising pivoting a blocking bar of the pallet blocking apparatus to access the pallet storage area. CLAUSE 15: A method of any clause in this paragraph further comprising sliding a blocking bar of the pallet blocking apparatus to access the storage area. CLAUSE 16: An apparatus of any clause in this paragraph having a first wall; a second wall substantially parallel to the first wall and spaced apart for allowing movement of a pallet stack with a top pallet and a bottom pallet there inbetween, the pallet stack being dispensed from the pallet dispenser; a pallet storage area defined by the space between the first wall, the second wall, and a pallet blocker; and the pallet blocker spanning the first wall and the second wall, and substantially perpendicular to the first wall and the second wall, the blocker for blocking the top pallet in the pallet stack and urging the top pallet into the pallet storage area.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A pallet dispensing apparatus for dispensing two pallets comprising:
    a pallet dispenser for dispensing a stack of pallets including a first pallet in a first plane and a second pallet in a second plane above the first pallet; and
    a pallet blocking apparatus positioned adjacent to the pallet dispenser, the pallet blocking apparatus having a pallet blocker for blocking the second pallet from the dispensed stack of pallets, and a pallet storage area outside the pallet dispenser for storing a third pallet in the first plane, wherein:
    the first pallet and the third pallet being removable from the pallet dispensing apparatus in response to movement of a double-deep pallet transporter with the first and third pallets out of the pallet dispenser while the second pallet is blocked by the blocker from passing through the pallet dispensing apparatus, the second pallet being moved to the pallet storage area in the first plane once the first and third pallets are removed.

2. The pallet dispensing apparatus of claim 1 wherein the pallet blocker pivots around a hinge on the pallet blocking apparatus so that the storage area for storing pallets is accessible.

3. The pallet dispensing apparatus of claim 1 wherein the pallet blocker slides on the pallet blocking apparatus so that the storage area for storing pallets is accessible.

4. A pallet blocking apparatus for use with a pallet dispenser comprising:
    a first wall;
    a second wall;
    a pallet blocker for blocking a pallet in a pallet stack, the pallet blocker spanning, at least in part, the first wall and the second wall on a first side of the walls opposite a second side of the walls where the pallet stack is located, and
    a pallet storage area positioned outside the pallet stack between the pallet blocker and the pallet stack for storing a pallet and configured to allow a pallet transporter to engage and remove the pallet stored in the pallet storage area.

5. The pallet blocking apparatus of claim 4 wherein the pallet blocker is pivotingly attached to the first wall and the second wall so that the pallet blocker can pivot away from an interior space defined by the first wall and the second wall so that the interior space can be accessed.

6. The pallet blocking apparatus of claim 5 wherein the pallet blocker further includes a counterweight so that, once pivoted, the pallet blocker is returned to its initial position by gravity.

7. The pallet blocking apparatus of claim 4 wherein the pallet blocker is in sliding communication with a top surface of the first wall and a top surface of the second wall, the top surface of the first wall and the top surface of the second wall having a blocker stop to prevent the pallet blocker from sliding off at least one of the top surface of the first wall and the top surface of the second wall.

8. The pallet blocking apparatus of claim 7 wherein the top surface of the first wall and the top surface of the second wall have an anti-friction coating/material to reduce frictional forces on the pallet blocker due to sliding.

9. The pallet blocking apparatus of claim 4 wherein the pallet blocking apparatus is positioned adjacent to and in-line with the pallet dispenser so that the pallet transporter can enter, at least in part, both the pallet blocking apparatus and the pallet dispenser.

10. A method for dispensing pallets comprising:
    engaging a first pallet in a first plane in a pallet storage area of a pallet blocking apparatus and a second pallet in the first plane in a pallet dispenser spaced from the pallet storage area with a pallet transporter, the second pallet being a bottom pallet of a pallet stack and a third pallet being positioned immediately above the second pallet in a second plane;
    lifting the first pallet and the second pallet with the pallet transporter from a work surface;
    lowering the first pallet, the second pallet, and the third pallet with the pallet transporter towards the work surface, the pallet stack being held by the pallet dispensing apparatus; and
    removing the first pallet, the second pallet, and the third pallet from the pallet dispensing apparatus, the third pallet being blocked by the pallet blocking apparatus and stored in the pallet storage area of the pallet blocking apparatus following removal of the first and second pallets.

11. The method of claim 10 further comprising:
    pivoting a blocking bar of the pallet blocking apparatus to access the pallet storage area.

12. The method of claim 10 further comprising:
    sliding a blocking bar of the pallet blocking apparatus to access the storage area.

13. A method for dispensing pallets comprising:
    engaging a first pallet in a first plane of a pallet stack held by a pallet dispensing apparatus, a second pallet being positioned in a second plane immediately above the first pallet;
    lifting the first pallet with the pallet transporter from a work surface;
    lowering the first pallet and the second pallet with the pallet transporter towards the work surface, the remaining pallet stack being held by the pallet dispensing apparatus;
    removing the first pallet from the pallet dispensing apparatus, the second pallet being blocked by a pallet blocking apparatus from being removed from the pallet blocking apparatus and stored in a pallet storage area in the first plane and outside the pallet stack once the first pallet is removed from the pallet dispensing apparatus;

engaging the second pallet in the pallet storage area with the pallet transporter so that the second pallet is adjacent to the first pallet on the pallet transporter; and removing the second pallet from the pallet dispensing apparatus.

14. The method of claim 13 further comprising:

pivoting a blocking bar of the pallet blocking apparatus to access the pallet storage area.

15. The method of claim 13 further comprising:

sliding a blocking bar of the pallet blocking apparatus to access the storage area.

16. A pallet blocking apparatus for use with a pallet dispenser comprising:

a first wall;

a second wall substantially parallel to the first wall and spaced apart for allowing movement of a pallet stack with a first pallet and a second pallet, the pallet stack being dispensed from the pallet dispenser;

a pallet storage area outside the pallet stack defined by the space between the first wall, the second wall, and a pallet blocker; and the pallet blocker spanning the first wall and the second wall on a first side of the walls opposite a second side of the walls where the pallet stack is located and substantially perpendicular to the first wall and the second wall, the pallet blocker for blocking the second pallet in the pallet stack and urging the second pallet into the pallet storage area.

* * * * *